United States Patent
Fukui et al.

(10) Patent No.: US 9,031,721 B2
(45) Date of Patent: May 12, 2015

(54) LEAKAGE DIAGNOSIS DEVICE AND LEAKAGE DIAGNOSIS METHOD

(71) Applicants: Keita Fukui, Susono (JP); Ryo Kondo, Toyota (JP); Yoshihisa Oda, Toyota (JP)

(72) Inventors: Keita Fukui, Susono (JP); Ryo Kondo, Toyota (JP); Yoshihisa Oda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 174 days.

(21) Appl. No.: 13/650,199

(22) Filed: Oct. 12, 2012

(65) Prior Publication Data

US 2013/0096757 A1    Apr. 18, 2013

(30) Foreign Application Priority Data

Oct. 14, 2011    (JP) .................................. 2011-227185

(51) Int. Cl.
G01M 3/04    (2006.01)
F02M 33/02   (2006.01)
F02M 25/08   (2006.01)
B60W 20/00   (2006.01)

(52) U.S. Cl.
CPC ........... *F02M 25/0809* (2013.01); *B60W 20/00* (2013.01)

(58) Field of Classification Search
CPC ......... G01M 3/04; B60W 20/00; F16K 31/02; F16K 37/00; F02M 33/02
USPC .......................... 701/107; 123/521; 137/487.5
See application file for complete search history.

(56) References Cited

U.S. PATENT DOCUMENTS

| | | | |
|---|---|---|---|
| 5,720,256 A | 2/1998 | Furuya et al. | |
| 6,945,093 B2* | 9/2005 | Amano et al. | 73/49.7 |
| 8,434,461 B2* | 5/2013 | Kerns et al. | 123/521 |
| 8,630,786 B2* | 1/2014 | Jackson et al. | 701/107 |
| 2007/0199374 A1 | 8/2007 | Shibuya | |
| 2012/0138169 A1* | 6/2012 | Kim et al. | 137/487.5 |

FOREIGN PATENT DOCUMENTS

| | | |
|---|---|---|
| JP | H09-144585 A | 6/1997 |
| JP | 2007-231814 A | 9/2007 |
| JP | 2010-216287 A | 9/2010 |

\* cited by examiner

*Primary Examiner* — John Q Nguyen
*Assistant Examiner* — Aaron Smith
(74) *Attorney, Agent, or Firm* — Gifford, Krass, Sprinkle, Anderson & Citkowski, P.C.

(57) ABSTRACT

The leakage diagnosis that carries out a leakage diagnosis on the basis of an internal pressure state of an airtight compartment by emitting gas from the compartment via a canister during a stop of the internal combustion engine includes; detecting a physical quantity that reflects a fuel adsorption state of the canister; and repeating the leakage diagnosis within the number of times of the leakage diagnosis, limited on the basis of the detected physical quantity. The compartment is formed in an evaporative fuel processing mechanism for an internal combustion engine. The evaporative fuel processing mechanism includes a fuel tank.

18 Claims, 14 Drawing Sheets

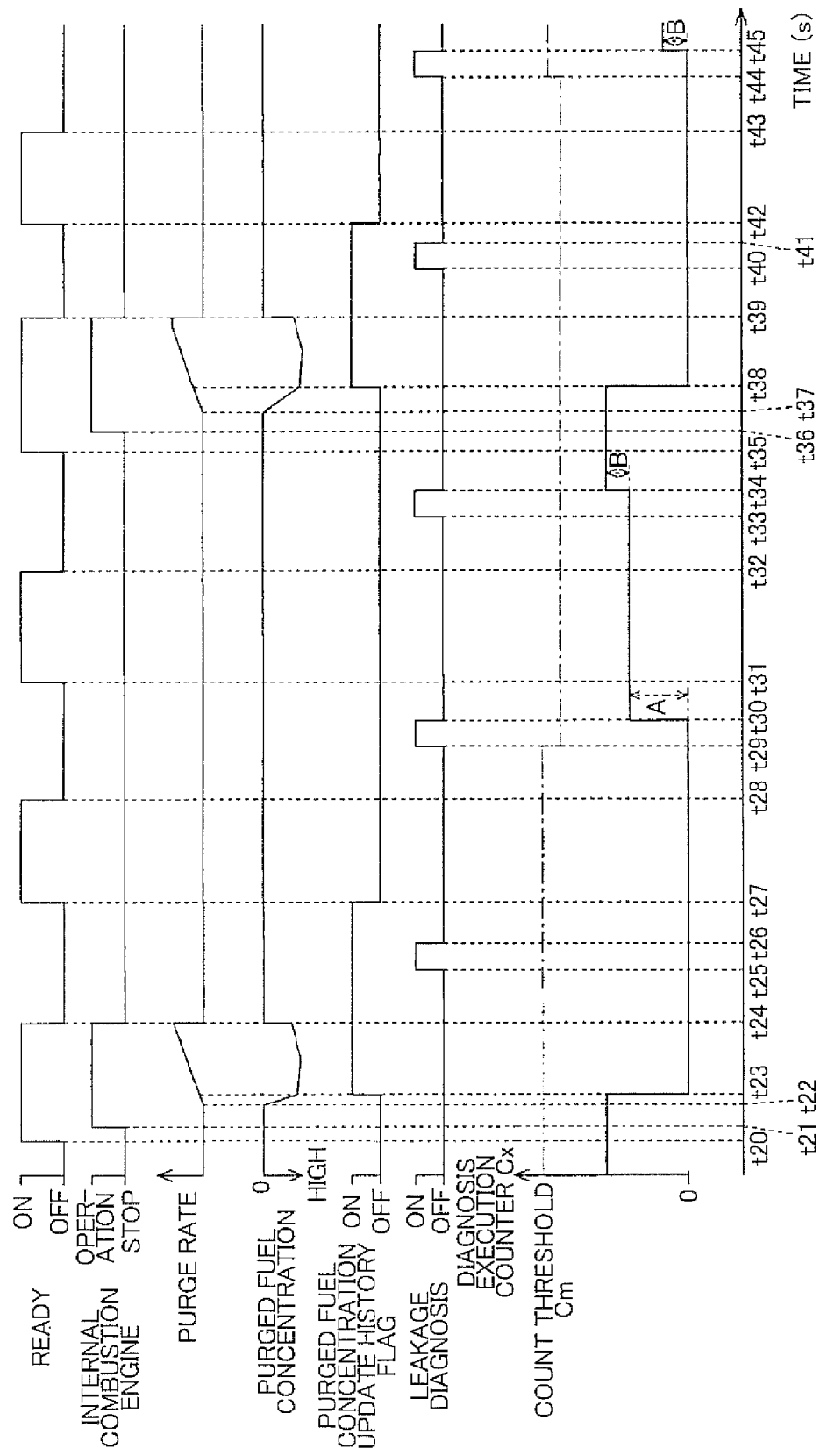

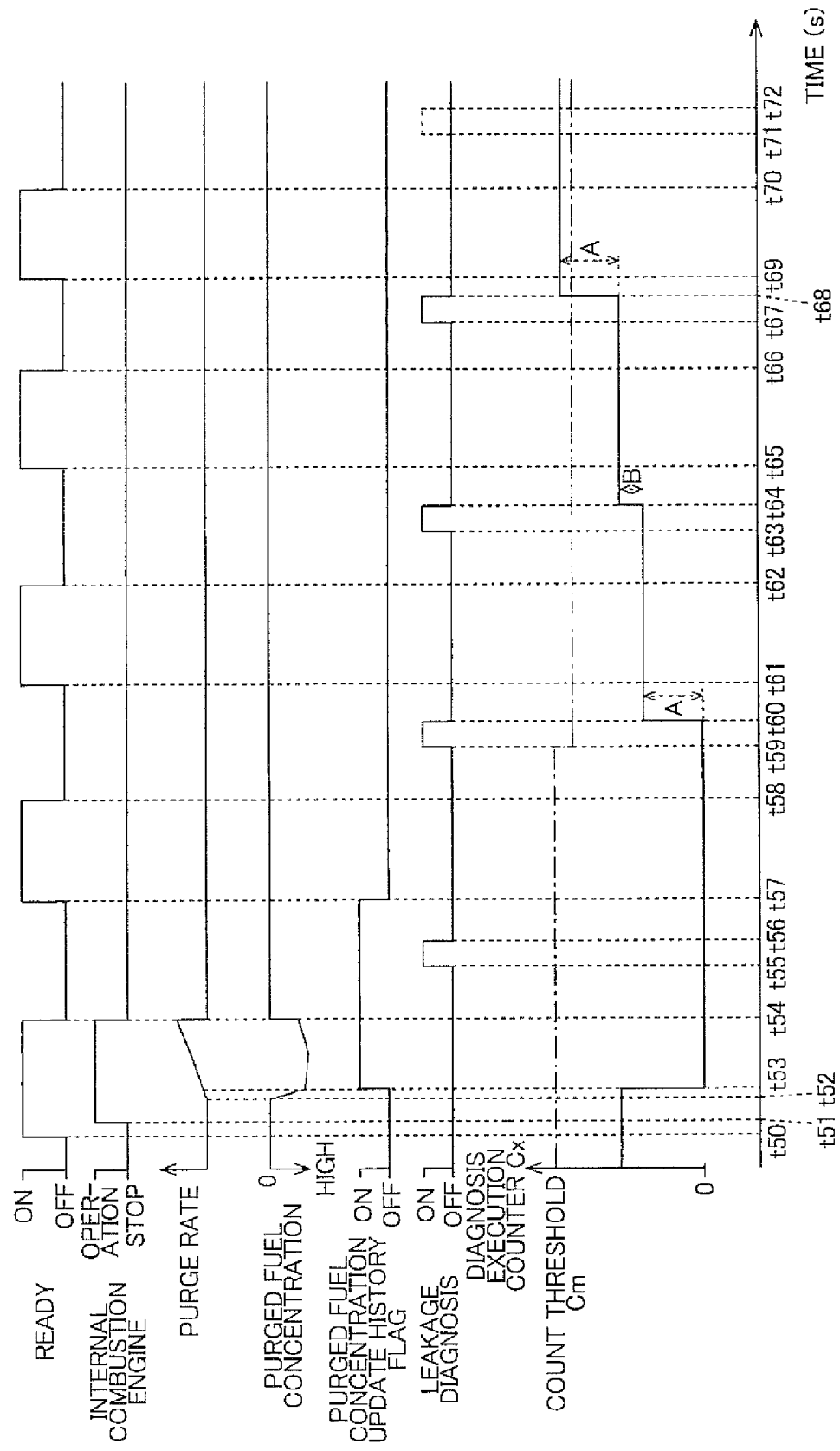

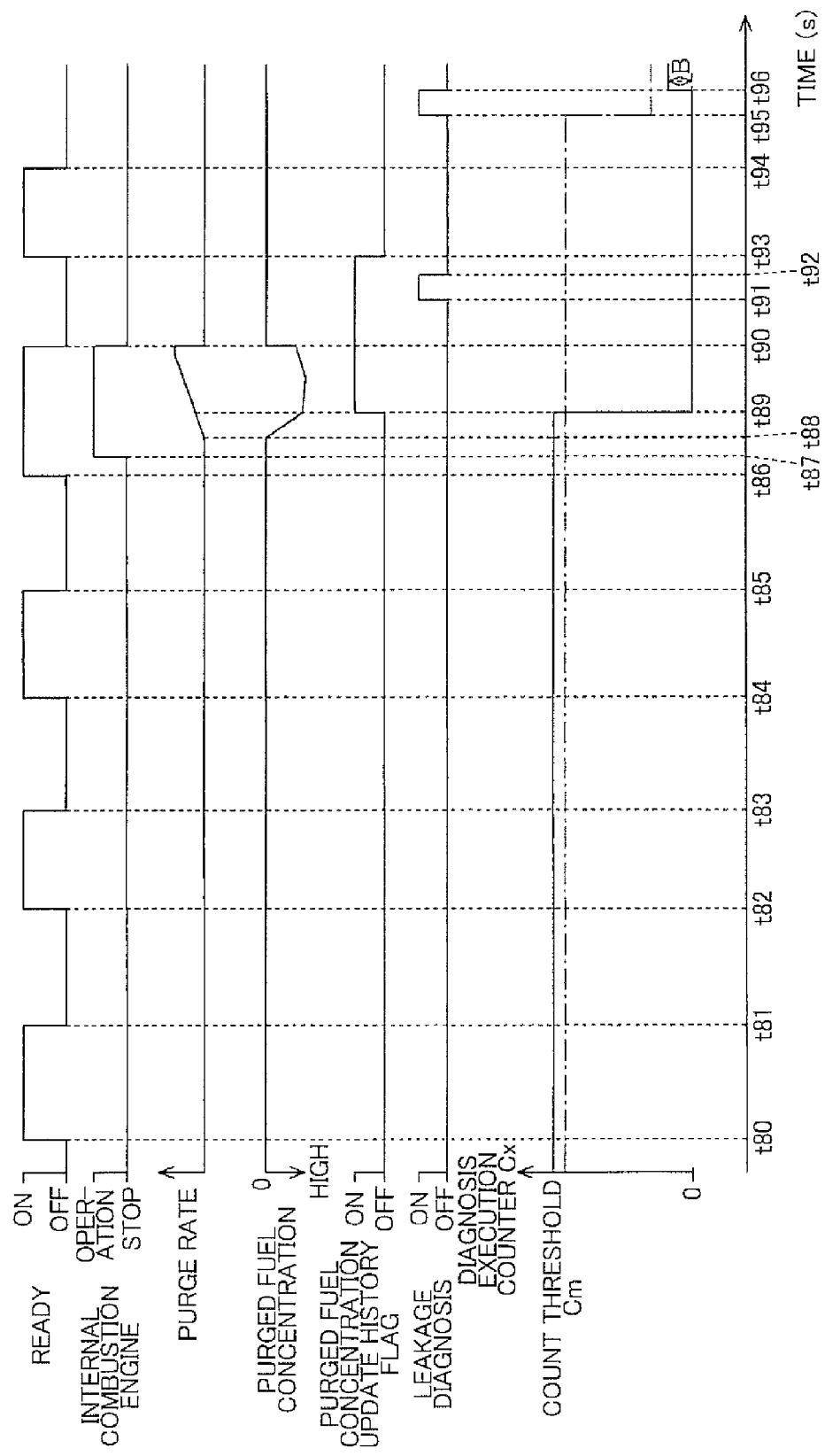

LEAKAGE DIAGNOSIS DEVICE AND LEAKAGE DIAGNOSIS METHOD

INCORPORATION BY REFERENCE

The disclosure of Japanese Patent Application No. 2011-227185 filed on Oct. 14, 2011 including the specification, drawings and abstract is incorporated herein by reference in its entirety.

BACKGROUND OF THE INVENTION

1. Field of the Invention

The invention relates to a leakage diagnosis device and leakage diagnosis method that carry out a leakage diagnosis on the basis of an internal pressure state of an airtight compartment, formed in an evaporative fuel processing mechanism, including a fuel tank, for an internal combustion engine, by emitting gas from the compartment via a canister during a stop of the internal combustion engine.

2. Description of Related Art

There is known a technique for diagnosing whether there is a leakage from an evaporative fuel processing mechanism, including a fuel tank, for an internal combustion engine, on the basis of an internal pressure variation at the time when the inside of the evaporative fuel processing mechanism is decreased in pressure by a pump during a stop of the internal combustion engine. When the pressure is decreased by the pump in order to carry out such a leakage diagnosis, it is required to prevent leakage of fuel vapor from a canister to an outside.

In order to prevent such a leakage of fuel vapor, there is proposed a technique for carrying out leakage diagnosis only when fuel vapor adsorbed in the canister during refueling is sufficiently released into intake air through purging during operation of the internal combustion engine thereafter (see page 8 to page 10 and FIG. 2 of Japanese Patent Application Publication No. 2010-216287 (JP 2010-216287 A)).

Particularly, in an internal combustion engine mounted on a hybrid vehicle, the internal combustion engine frequently stops, so purging itself is also repeatedly carried out and stopped in a short period of time. Therefore, detecting a purge amount in a single operation of the internal combustion engine does not determine whether fuel vapor adsorbed in the canister has been sufficiently purged.

In order to take measures for this inconvenience, in JP 2010-216287 A, in the internal combustion engine that is repeatedly operated and stopped, a purge amount in each operation is accumulated, a fuel adsorption state of the canister is determined on the basis of the accumulated purge amount and a leakage diagnosis is carried out in a state where fuel vapor has been sufficiently removed from the canister.

In a hybrid vehicle, particularly, a plug-in hybrid vehicle, when the hybrid vehicle is charged from an external power supply, the internal combustion engine may be stopped for a long period of time even when vehicle frequently repeats travelling. In such a case, in order to early find a leakage, it is required to carry out a leakage diagnosis not only once after a stop of the internal combustion engine but repeatedly.

When a leakage diagnosis is carried out, the pressure inside the evaporative fuel processing mechanism, including the fuel tank, is decreased by emitting gas from the evaporative fuel processing mechanism to an outside via the canister with the use of the pump, so fuel vapor in the fuel tank flows into the canister each time a leakage diagnosis is carried out.

In JP 2010-216287 A, in the first leakage diagnosis immediately after a stop of the internal combustion engine, it is possible to determine whether to carry out a leakage diagnosis on the basis of the accumulated purge amount (a purge fuel concentration used to calculate the accumulated purge amount) detected during operation of the internal combustion engine. Therefore, even when a leakage diagnosis is carried out, fuel vapor is not likely to leak from the canister to an outside.

However, when a leakage diagnosis is repeated thereafter in a state where the internal combustion engine is stopped, fuel vapor is repeatedly introduced from the fuel tank into the canister. Thus, the amount of :fuel adsorbed in the canister gradually increases, and a remaining adsorption capacity decreases. Thus, when a leakage diagnosis is repeated in a state where the internal combustion engine is stopped, the canister finally becomes a saturated state, so there is a possibility that an erroneous diagnosis is carried out or fuel vapor leaks from the canister to an outside.

Therefore, when a leakage diagnosis is carried out only once immediately after a stop of the internal combustion engine and the stop of the internal combustion engine extends over a long period of time, the frequency of leakage diagnosis may be insufficient.

SUMMARY OF THE INVENTION

The invention provides a leakage diagnosis device and leakage diagnosis method that are able to increase the frequency of leakage diagnosis without bringing a canister into a saturated state even when a stop of an internal combustion engine extends over a long period of time.

A first aspect of the invention provides a leakage diagnosis device that carries out a leakage diagnosis on the basis of an internal pressure state of an airtight compartment by emitting gas from the compartment via a canister during a stop of an internal combustion engine. The compartment is formed in an evaporative fuel processing mechanism for the internal combustion engine. The evaporative fuel processing mechanism includes a fuel tank. The leakage diagnosis device includes: a detecting unit that detects a physical quantity that reflects a fuel adsorption state of the canister; and a leakage diagnosis repeating unit that repeats the leakage diagnosis within the number of times of the leakage diagnosis, limited on the basis of the detected physical quantity.

The physical quantity detected by the leakage diagnosis device reflects the fuel adsorption state of the canister, so it is possible to determine a degree of a remaining fuel adsorption capacity of the canister on the basis of the physical quantity. Thus, after the physical quantity is detected, by limiting the number of times of leakage diagnosis on the basis of the physical quantity, even when a leakage diagnosis is repeated in a state where a stop of the internal combustion engine is continued, the canister is not brought into a saturated state. In this way, it is possible to repeat a leakage diagnosis within the limited number of times, so, even when a stop of the internal combustion engine extends over a long period of time, it is possible to increase the frequency of leakage diagnosis without bringing the canister into a saturated state.

The leakage diagnosis device according to the above aspect may further include a setting unit configured to set a count threshold on the basis of the physical quantity when the physical quantity is detected by the detecting unit, the count threshold limiting the number of times of the leakage diagnosis during a stop of the internal combustion engine. The leakage diagnosis repeating unit may be configured to repeat the leakage diagnosis within the number of times limited on the basis of the count threshold, when the count threshold is set by the setting unit.

The physical quantity detected by the detecting unit reflects the fuel adsorption state of the canister, so the setting unit is able to set a count threshold, by which the number of times of leakage diagnosis is limited during a stop of the internal combustion engine, on the basis of the physical quantity. The leakage diagnosis repeating unit is able to repeat a leakage diagnosis without bringing the canister into a saturated sate until the number of times of leakage diagnosis reaches the count threshold. Therefore, even when a stop of the internal combustion engine extends over a long period of time, it is possible to increase the frequency of leakage diagnosis without bringing the canister into a saturated state.

In the leakage diagnosis device according to the above aspect, the leakage diagnosis repeating unit may be configured to execute i) a count process of performing a process of clearing a diagnosis execution counter each time the count threshold is set and a process of adding an accumulated value to the diagnosis execution counter each time the leakage diagnosis is carried out after the count threshold is set, and ii) a leakage diagnosis limiting process of permitting the leakage diagnosis to be repeatedly carried out while the diagnosis execution counter is smaller than the count threshold and prohibiting the leakage diagnosis from being repeatedly carried out when the diagnosis execution counter is equal to or larger than the count threshold.

In the leakage diagnosis repeating unit, the diagnosis execution counter to which the accumulated value is added each time a leakage diagnosis is carried out is compared with the count threshold set by the setting unit as described above. Through the above comparison, it is possible to repeat a leakage diagnosis until the number of times of leakage diagnosis reaches the count threshold. Therefore, even when a stop of the internal combustion engine extends over a long period of time, it is possible to increase the frequency of leakage diagnosis without bringing the canister into a saturated state.

In the leakage diagnosis device according to the above aspect, in the count process of the leakage diagnosis repeating unit, the accumulated value may be set on the basis of a state where fuel vapor is introduced into the canister at the time of each leakage diagnosis or a state where fuel vapor is introduced into the canister at the time of a process performed in synchronization with each leakage diagnosis, and the accumulated value may be added to the diagnosis execution counter.

The state of fuel vapor introduced into the canister is different for each leakage diagnosis or each process performed in synchronization with the leakage diagnosis on the basis of the compartment set in the, evaporative fuel processing mechanism and its state. Therefore, the accumulated value to be added to the diagnosis execution counter is set on the basis of the state of fuel vapor introduced into the canister at the time of each leakage diagnosis or the state of fuel vapor introduced into the canister at the time of a process performed in synchronization with each leakage diagnosis. By so doing, the leakage diagnosis repeating unit is able to highly accurately limit the number of times of leakage diagnosis, and is able to increase the frequency of leakage diagnosis without bringing the canister into a saturate state.

In the leakage diagnosis device according to the above aspect, in the count process of the leakage diagnosis repeating unit, when the fuel tank is included in the compartment, the accumulated value may be set on the basis of an internal pressure of the fuel tank before the leakage diagnosis, and the accumulated value may be added to the diagnosis execution counter.

Particularly, the internal pressure of the fuel tank significantly influences the amount of fuel vapor in the compartment. Therefore, by setting the accumulated value on the basis of the internal pressure of the fuel tank, the leakage diagnosis repeating unit is able to highly accurately limit the number of times of leakage diagnosis.

In the leakage diagnosis device according to the above aspect, the leakage diagnosis repeating unit may be configured to determine whether to carry out a first leakage diagnosis, executed immediately after the count threshold is set, on the basis of the physical quantity detected by the detecting unit, the leakage diagnosis repeating unit may be configured to prohibit a subsequent leakage diagnosis from being carried out until the physical quantity is newly detected, when the first leakage diagnosis is not executed; the leakage diagnosis repeating unit may be configured to execute the count process and the leakage diagnosis limiting process, when the first leakage diagnosis is executed.

The count threshold is set on the basis of the physical quantity that reflects the fuel adsorption state of the canister, so it is possible to determine whether to carry out the first leakage diagnosis, carried out immediately after the count threshold is set, on the basis of the physical quantity.

If the first leakage diagnosis is not carried out, a leakage diagnosis subsequent to the first leakage diagnosis is prohibited because there is a possibility that the canister is brought into a saturated state when a leakage diagnosis is carried out in the same internal combustion engine stopped state.

When the first leakage diagnosis is carried out, the count process and the leakage diagnosis limiting process are executed. By so doing, the leakage diagnosis repeating unit is able to highly accurately limit the number of times of leakage diagnosis, and is able to increase the frequency of leakage diagnosis without bringing the canister into a saturate state.

In the leakage diagnosis device according to the above aspect, the detecting unit may be configured to detect a purged fuel concentration, as the physical quantity, at the time when fuel vapor is purged from the canister to an intake passage of the internal combustion engine during operation of the internal combustion engine.

The physical quantity that reflects the fuel adsorption state of the canister may be a purged fuel concentration during operation of the internal combustion engine. When the purged fuel concentration is high, it is determined that the canister is in the fuel adsorption state where the remaining adsorption capacity of the canister is small or the canister is not able to adsorb fuel vapor anymore; whereas, when the purged fuel concentration is low, it is determined that the canister is in the fuel adsorption state where the remaining adsorption capacity of the canister is sufficient. By so doing, the leakage diagnosis count threshold setting unit is able to highly accurately set the count threshold, and the leakage diagnosis repeating unit is able to highly accurately limit the number of times of leakage diagnosis.

In the leakage diagnosis device according to the above aspect, the detecting unit may be configured to detect the purged fuel concentration on the basis of a control deviation amount in air-fuel ratio in air-fuel ratio feedback control executed during purging. It is possible to detect the purged fuel concentration on the basis of a control deviation during air-fuel ratio feedback control without providing a special sensor, or the like.

In the leakage diagnosis device according to the above aspect, a shut-off valve may be provided between the fuel tank and the canister, and the shut-off valve may be configured to be closed to hermetically close the fuel tank during a stop of the internal combustion engine, and may be configured to be opened to emit gas from the fuel tank via the canister at the time of the leakage diagnosis of the fuel tank, and the leakage diagnosis may be performed on the basis of an internal pressure state of the fuel tank at the time of the leakage diagnosis.

In this way, when the fuel tank is configured to be hermetically closed by the shut-off valve during a stop of the internal combustion engine, the shut-off valve is opened at the time of a leakage diagnosis of the fuel tank. The hermetically closed fuel tank may store a large amount of high-pressure fuel vapor inside, and, when a leakage diagnosis of the fuel tank is carried out, such a large amount of fuel vapor may be introduced into the canister. Thus, as described above, it is important to limit the number of times of leakage diagnosis on the basis of the physical quantity. In the above configuration that the shut-off valve is provided, even when a stop of the internal combustion engine extends over a long period of time, it is possible to increase the frequency of leakage diagnosis without bringing the canister into a saturated state.

In the leakage diagnosis device according to the above aspect, the internal combustion engine may be mounted on a vehicle as a vehicle drive source together with an electric motor, and a control that performs EV travelling in which the vehicle travels with only an output from the electric motor and HV travelling in which the vehicle travels with an output from the internal combustion engine and an output from the electric motor may be executed by an electronic control unit.

In the case of a so-called hybrid vehicle, a stop of the internal combustion engine may extend over a long period of time due to EV travelling. In such a case as well, it is possible to increase the frequency of leakage diagnosis without bringing the canister into a saturated state.

In the leakage diagnosis device according to the above aspect, a storage battery that supplies electric power to the electric motor may be chargeable from a power supply outside the vehicle, other than charging with electric power generated by the internal combustion engine.

Particularly, when the storage battery that supplies electric power to the electric motor is chargeable from a power supply outside the vehicle, other than charging with electric power generated by the internal combustion engine, the opportunity of operating the internal combustion engine may tend to extremely reduce.

A second aspect of the invention provides a leakage diagnosis method that carries out a leakage diagnosis on the basis of an internal pressure state of an airtight compartment by emitting gas from the compartment via a canister during a stop of the internal combustion engine. The compartment is formed in an evaporative fuel processing mechanism for an internal combustion engine. The evaporative fuel processing mechanism includes a fuel tank. The leakage diagnosis method includes: detecting a physical quantity that reflects a fuel adsorption state of the canister; and repeating the leakage diagnosis within the number of times of the leakage diagnosis, limited on the basis of the detected physical quantity.

With the above configuration as well, a leakage diagnosis is repeated within the number of times limited on the basis of the physical quantity, so, even when a stop of the internal combustion engine extends over a long period of time, it is possible to increase the frequency of leakage diagnosis without bringing the canister into a saturated state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a timing chart that shows an example of control according to the first embodiment;

FIG. 9 is a timing chart that shows an example of control according to the first embodiment;

FIG. 10 is a timing chart that shows an example of control according to the first embodiment;

DETAILED DESCRIPTION OF EMBODIMENTS

First Embodiment
Configuration of First Embodiment

Figure 1:
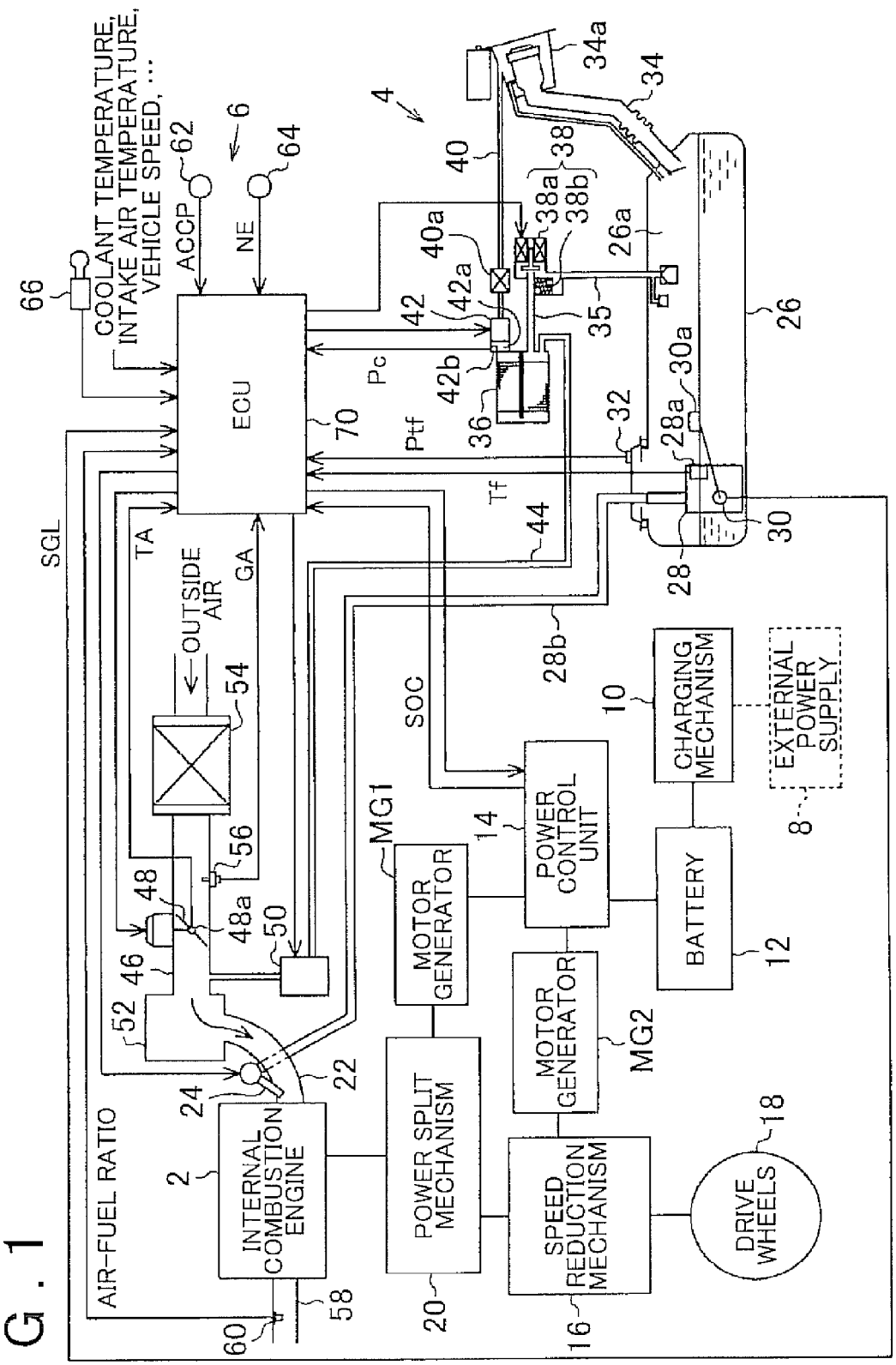
FIG. 1 is a block diagram that shows a drive system in a hybrid vehicle according to a first embodiment.

FIG. 1 is a block diagram of a drive system in a hybrid vehicle to which the above-described aspect of the invention is applied. The drive system includes an internal combustion engine 2 and electric motors (motor generators MG1 and MG2 (described later)). The internal combustion engine 2 is a gasoline engine. The internal combustion engine 2 includes a fuel supply system 4 and a control system 6.

The hybrid vehicle is a plug-in hybrid vehicle. Thus, a battery 12 is chargeable from an external power supply 8 via a charging mechanism 10. Electric power of the battery 12 is supplied to the motor generator MG2 by a power control unit 14. By so doing, rotational driving force is output from the motor generator MG2.

Rotational driving force from the internal combustion engine 2 and the motor generator MG2 is reduced in speed by a speed reduction mechanism 16, and is then transmitted to drive wheels 18. A power split mechanism 20 is arranged between the internal combustion engine 2 and the speed reduction mechanism 16, and is able to split and supply the rotational driving force of the internal combustion engine 2 to a side adjacent to the speed reduction mechanism 16 and a side adjacent to the other motor generator MG1 that serves as a generator.

Note that each of the two motor generators MG1 and MG2 functions as not only a generator but also an electric motor and is able to switch between the functions as needed. Fuel injection valves 24 are respectively arranged in intake ports 22 corresponding to cylinders of the internal combustion engine 2. Fuel stored in a fuel tank 26 is fed under pressure by a fuel pump module 28 to these fuel injection valves 24 via a fuel passage 28b. Then, through fuel injection control, fuel is injected into intake air from each fuel injection valve 24 at a predetermined timing and is introduced into a corresponding one of the cylinders and burned. By so doing, the internal combustion engine 2 is operated.

Furthermore, a fuel temperature sensor 28a is attached to the fuel pump module 28. A fuel temperature in the fuel supply system 4, particularly, a fuel temperature Tf in the fuel tank 26, is detected by the fuel temperature sensor 28a.

The fuel supply system 4 also functions as a vapor fuel processing apparatus (a evaporative fuel processing mechanism), and is formed of the fuel tank 26, a canister 36, associated various passages, various valves, various pumps, and the like. A fuel sender gauge 30 is provided in the fuel tank 26. The fuel sender gauge 30 is used to detect a fuel liquid level SGL in the fuel tank 26 by a float 30a. A tank internal pressure sensor 32 is provided at the top of the fuel tank 26. The tank internal pressure sensor 32 detects a pressure (tank internal pressure Ptf) inside an upper space 26a of the fuel tank 26. The tank internal pressure Ptf (Pa) is actually a differential pressure between atmospheric pressure and a pressure in the upper space 26a. Instead, the tank internal pressure sensor 32 may be configured to detect an absolute pressure in the upper space 26a.

Fuel is introduced into the fuel tank 26 via a fuel inlet pipe 34 during refueling. The upper space 26a of the fuel tank 26 is connected to the canister 36 via a vapor fuel passage 35. A shut-off valve unit 38 is provided in the middle of the vapor fuel passage 35. The shut-off valve unit 38 includes a shut-off valve 38a and a relief valve 38b.

The shut-off valve 38a is a normally-closed electromagnetic valve that is opened when supplied with current. The shut-off valve 38a is controlled to a valve open state during refueling. By so doing, the upper space 26a of the fuel tank 26 and the inside of the canister 36 are in fluid communication via the vapor fuel passage 35. Therefore, during refueling, fuel vapor produced in the upper space 26a of the fuel tank 26 is emitted toward the canister 36. Then, in the canister 36, the fuel vapor is adsorbed by an adsorbent, such as activated carbon, accommodated inside. By so doing, fuel vapor is prevented from leaking to an outside.

In the case where the shut-off valve 38a is in a valve closed state, that is, when the vapor fuel passage 35 is shut off and the fuel tank 26 is hermetically closed, fuel vapor produced in the upper space 26a of the fuel tank 26 is not emitted toward the canister 36.

An atmosphere passage 40 is connected to the canister 36. The atmosphere passage 40 is in fluid communication with a fuel inlet box 34a provided at the fuel inlet pipe 34. An air filter 40a is provided in the middle of the atmosphere passage 40. Furthermore, a leakage diagnosis pump module 42 is provided in the atmosphere passage 40 at a location closer to the canister 36 than the air filter 40a. Note that an atmosphere open valve 42a and a pressure sensor 42b are attached to the leakage diagnosis pump module 42. The atmosphere open valve 42a is a normally-open electromagnetic valve and opens the inside of the canister 36 to the atmosphere via the atmosphere passage 40. The pressure sensor 42b detects an internal pressure Pc in the canister 36.

The canister 36 is connected to an intake passage 46 of the internal combustion engine 2 via a purge passage 44. Particularly, the canister 36 is connected to the intake passage 46 at a location downstream of a throttle valve 48 that adjusts an intake air flow rate. A purge control valve 50 that is a normally-closed electromagnetic valve is arranged in the middle of the purge passage 44.

The purge control valve 50 and the atmosphere open valve 42a are placed in a valve open state during operation of the internal combustion engine 2. By so doing, purging is carried out. That is, when the negative pressure of intake air inside the intake passage 46 is introduced from the purge passage 44 into the canister 36, fuel vapor desorbs from the adsorbent inside the canister 36, and is released into a stream of air introduced from the atmosphere passage 40. Then, fuel vapor passes through the purge control valve 50 from the purge passage 44 together with a stream of air, and is released into intake air flowing inside the intake passage 46. At this time, a purge rate into intake air is adjusted by the opening degree of the purge control valve 50. Intake air that contains purged fuel vapor flowing into a surge tank 52 is distributed to each of the intake ports 22 of the cylinders, flows into a combustion chamber of a corresponding one of the cylinders together with fuel injected from the fuel injection valve 24, and is burned.

In the intake passage 46, an air flow meter 56 is provided between the air filter 54 and the throttle valve 48, and detects an intake air flow rate GA (g/sec) at which intake air is supplied to the internal combustion engine 2.

An air-fuel ratio sensor (or oxygen sensor) 60 is provided in an exhaust passage 58 to which burned exhaust gas is emitted from the internal combustion engine 2, and detects an air-fuel ratio or an oxygen concentration from exhaust components in order to execute air-fuel ratio feedback control.

Other than that, an accelerator operation amount sensor 62, an engine rotation speed sensor 64, an ignition switch (IGSW) 66 and other sensors and switches are provided, and respectively output signals. The accelerator operation amount sensor 62 is provided at an accelerator pedal operated by a vehicle driver, and detects an accelerator operation amount ACCP. The engine rotation speed sensor 64 detects a rotation speed NE of a crankshaft of the internal combustion engine 2. The other signals are, for example, a coolant temperature, an intake air temperature, a vehicle speed, and the like.

Detected signals of the fuel temperature sensor 28a, the fuel sender gauge 30, a throttle opening degree sensor 48a, the air flow meter 56, the air-fuel ratio sensor 60, the accelerator operation amount sensor 62, the engine rotation speed sensor 64, the IGSW 66, and the like, are input to an electronic control unit (ECU) 70 that is mainly formed of a microcomputer.

The ECU 70 executes arithmetic processing on the basis of such signal data or prestored or calculated data, and controls a fuel injection amount from each fuel injection valve 24, the opening degree TA of the throttle valve 48, and the like.

Furthermore, the ECU 70 executes purge control process in a period during which the internal combustion engine 2 is operated. In the purge control process, as the shut-off valve 38a is opened in accordance with refueling, fuel vapor adsorbed in the canister 36 from the fuel tank 26 via the vapor fuel passage 35 is released into the intake passage 46 during operation of the internal combustion engine.

In the purge control process, the purge rate is adjusted by executing duty control over a valve open state of the purge control valve 50, and fuel vapor adsorbed in the canister 36 is released into the intake passage 46 via the purge passage 44. Note that the concentration of fuel vapor purged at this time (purged fuel concentration) is calculated as a learning value through periodically performed computation on the basis of a control deviation amount in air-fuel ratio in air-fuel ratio feedback control executed by the ECU 70.

Operation of First Embodiment

Next, the operation of the present embodiment will be described on the basis of a leakage diagnosis preliminary process (FIG. 2) and a leakage diagnosis process (FIG. 3 and FIG. 4) executed by the ECU 70. The processes are repeatedly executed at set time intervals. Note that steps in the flowcharts, corresponding to individual processing details, are denoted by "S"+"numeric value".

When the leakage diagnosis preliminary process (FIG. 2) is started, it is initially determined whether the vehicle is in a READY-ON state (S102). The READY-ON state indicates a state where a key is turned On and the hybrid vehicle is ready for travelling, including a state where the hybrid vehicle is travelling.

Here, when the vehicle is not in the READY-ON state (NO in S102), the process directly exits. Thus, no substantial process is executed. When the vehicle is in the READY-ON state (YES in S102), it is subsequently determined whether it is the first process in the current READY-ON state (S104). When it is the first process (YES in S104), a purged fuel concentration update history flag is subsequently set to an OFF state (S106).

After that, it is determined whether purge control is being carried out (S108). That is, it is determined whether the internal combustion engine 2 is operated and fuel vapor is being purged from the canister 36 into the intake passage 46 through control over the opening degree of the purge control valve 50.

When the internal combustion engine 2 is not operated or when purge control itself is not being executed even when the internal combustion engine 2 is operated (NO in S108), the process directly exits. When the vehicle remains in the READY-ON state, affirmative determination is made in step S102 in the next execution cycle; however, it is not the first process (NO in S104), so it is immediately determined whether purge control is being executed (S108). When a state where purge control is not executed is continued (NO in S108), the process directly exits.

Even when the vehicle remains in the READY-ON state but the vehicle enters a READY-OFF state without executing purge control at all during then, it returns to a state where negative determination is made in step S102. When purge control is started in the READY-ON state (YES in S108), it is subsequently determined whether there is a purged fuel concentration update history (S110).

As described above, the purged fuel concentration is calculated as a learning value through periodically performed computation on the basis of a control deviation amount in air-fuel ratio in air-fuel ratio feedback control executed by the ECU 70. The purged fuel concentration is calculated as a learning value in this way, so, in order to calculate a new purged fuel concentration as a highly accurate value in purge control started after the current READY-ON state, a certain number of times of learning is required.

Thus, even when the vehicle is in the READY-ON state (YES in S102) and purge control is being executed (YES in S108), it is determined that no purged fuel concentration update history is generated (NO in S110) until a highly accurate learning value is calculated, and the process in step S112 and the following processes are not executed. Thus, when the vehicle enters the READY-OFF state under the above situation, it returns to a state where negative determination is made in step S102.

When learning in air-fuel ratio feedback control is repeated and a highly accurate learning value is calculated, the purged fuel concentration is updated. This means that an update history is generated (YES in S110), the purged fuel concentration update history flag is set to an ON state (S112). Then, the updated purged fuel concentration is stored as a purged fuel concentration storage value fp (S114). Then, a diagnosis execution counter Cx is cleared (S116), and the process exits.

in the following execution cycles, when purge control is executed in the READY-ON state and the purged fuel concentration is repeatedly updated (YES in S110), steps S112 to S116 are executed each time the purged fuel concentration is updated. Thus, the purged fuel concentration storage value fp constantly reflects the latest purged fuel concentration.

Next, the leakage diagnosis process (FIG. 3 and FIG. 4) will be described. When the process is started, it is initially determined whether a leakage diagnosis condition is satisfied (S136). The leakage diagnosis condition is, for example, a state where a period of time of about several hours has elapsed after the vehicle enters the READY-OFF state. Other than that, for example, a condition that a leakage diagnosis prohibition (described later) is not performed is added as an AND condition. Furthermore, a condition that, for example, an outside air pressure and an outside air temperature respectively fall within predetermined ranges may be added as an AND condition.

Here, when the leakage diagnosis condition is not satisfied (NO in S136), the process directly exits, so no substantial process is executed. When the leakage diagnosis condition is satisfied (YES in S136), the state of the purged fuel concentration update history flag is subsequently determined (S138). This is to determine whether the current fulfillment of the leakage diagnosis condition is made immediately after the purged fuel concentration is updated.

Here, when the purged fuel concentration update history flag is in the ON state, that is, when the current fulfillment of the leakage diagnosis condition is made immediately after the purged fuel concentration is updated, it is subsequently determined whether the purged fuel concentration stored as the purged fuel concentration storage value fp is higher than a reference concentration (S140). The reference concentration is set as a reference that indicates that the canister 36 is in a fuel adsorption state where there is a sufficient margin of adsorbing fuel vapor at or below the reference concentration and a leakage diagnosis is allowed.

Here, when the purged fuel concentration storage value fp is higher than the reference concentration (YES in S140), a leakage diagnosis is not allowed, so leakage diagnosis prohibition is set until the purged fuel concentration is updated next time (S142). Thus, after that, until the operation of the internal combustion engine 2 is started and the purged fuel concentration is newly updated through air-fuel ratio feedback control, the leakage diagnosis condition in step S136 is not satisfied.

When the purged fuel concentration storage value fp is smaller than or equal to the reference concentration (NO in S140), it is subsequently determined whether the tank internal pressure Ptf that is detected as a relative pressure with respect to atmospheric pressure by the tank internal pressure sensor 32 falls within a predetermined range (S148). The predetermined range indicates a range in which a differential pressure is small with respect to atmospheric pressure. Specifically, as expressed by the inequality (1), it is determined whether the tank internal pressure Ptf is between a lower limit value L(Pa) (<0) and an upper limit value H(Pa) (>0).

$$L \leq Ptf \leq H \tag{1}$$

The shut-off valve 38a is in a valve closed state in the READY-OFF state. In the above state, a state where the tank internal pressure Ptf is lower than the lower limit value L or higher than the upper limit value 14, that is, a state where the inequality (1) is not satisfied, indicates that no leakage is occurring in the fuel tank 26 that is a compartment hermetically closed by the shut-off valve 38a.

However, the state where the inequality (1) is satisfied includes the case where no leakage is occurring in the fuel tank 26 but internal fuel vapor pressure causes the inequality (1) to hold due to the temperature of the fuel tank 26 and the case where a leakage is occurring in the fuel tank 26 and it is not possible to keep internal fuel vapor pressure.

Figure 5:
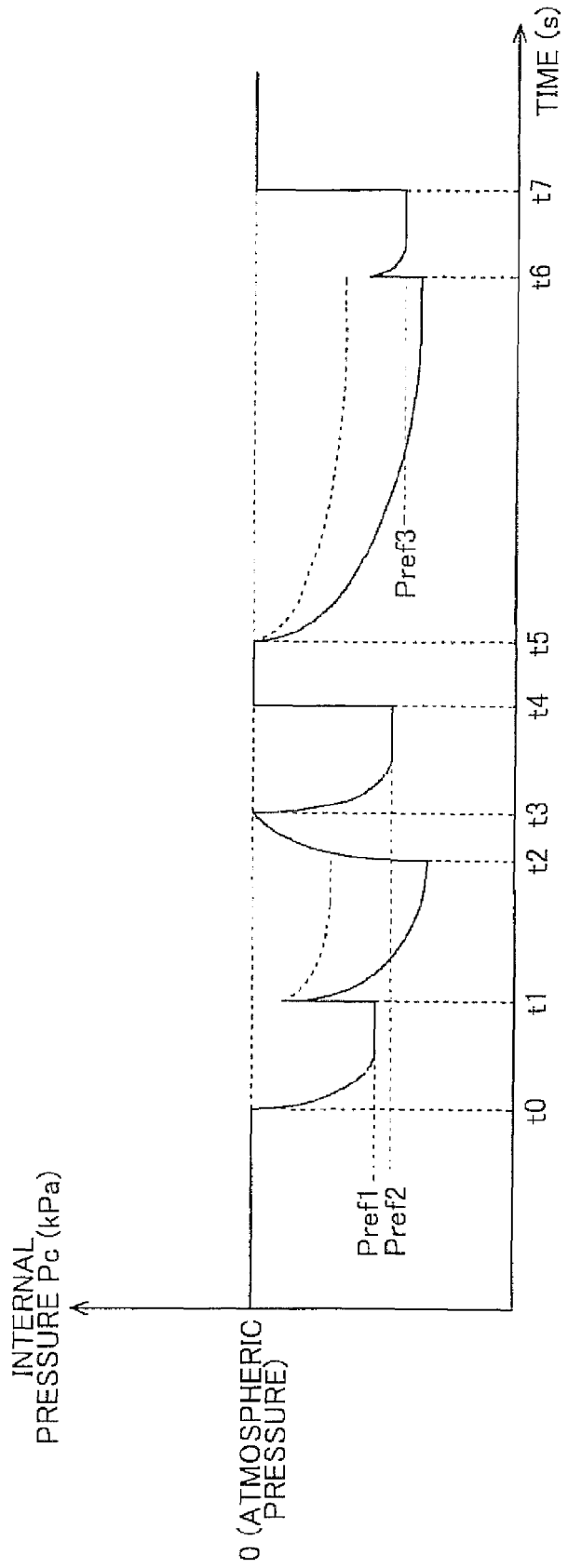
FIG. 5 is a timing chart that shows an example of the leakage diagnosis process in the case where a tank internal pressure is close to atmospheric pressure.

When the inequality (1) is satisfied (YES in S148), there is a possibility that a leakage is occurring in the fuel tank 26 as described above, so the leakage diagnosis process for the canister 36 (S150) and the leakage diagnosis process for the fuel tank 26 (S152) are executed. The two leakage diagnosis processes (S150 and S152) are executed as shown in FIG. 5. The timing chart shown in FIG. 5 indicates an example of a variation in pressure detected by the pressure sensor 42b during a leakage diagnosis.

Initially, the leakage diagnosis process for the canister 36 is executed (S150). The atmosphere open valve 42a is in a valve open state at the time when the leakage diagnosis condition is satisfied. Therefore, a pressure initially detected by the pressure sensor 42b is the internal pressure of the canister 36 that is open to the atmosphere, and the internal pressure of the canister 36 is equal to atmospheric pressure before leakage diagnosis start timing to, so the pressure initially detected by the pressure sensor 42b is 0 (kPa).

At first, the atmosphere is drawn via a reference orifice by the pump as a calibration. The reference orifice has a diameter of 0.5 mm and is provided in a pump inside the leakage diagnosis pump module 42 In this drawing state, a pressure between the pump and the reference orifice is detected by the pressure sensor 42b (t0 to t1). By so doing, an internal pressure Pc equivalent to that in the case where a 0.5 mm leakage hole is present at the side adjacent to the canister 36 is detected as φ0.5-hole determination value Pref1.

Subsequently, by switching a selector valve (actually, the atmosphere open valve 42a itself also functions as the selector valve), gas is emitted from the canister 36 to the atmosphere without passing through the reference orifice (t1 to t2). In this state, the internal pressure Pc adjacent to the canister 36 is detected by the pressure sensor 42b as indicated by the solid line.

After that, the selector valve is returned to an original state, and the atmosphere is drawn by the pump via the reference orifice again as a calibration. In this state, a pressure between the pump and the reference orifice is detected by the pressure sensor 42b (t3 to t4). By so doing, a second φ0.5-hole determination value Pref2 is detected.

When a difference between the φ0.5-hole determination value Pref2 measured for the second time and the φ0.5-hole determination value Pref1 measured for the first time is sufficiently small, it is possible to determine that the accuracy of the φ0.5-hole determination values Pref1 and Pref2 is sufficiently ensured. Thus, the φ0.5-hole determination value Pref1 measured for the second time is compared with an attained value (t2) of the internal pressure Pc measured by reducing the pressure adjacent to the canister 36 just before.

As indicated by the solid line, when the attained value (t2) of the internal pressure Pc is lower than the second φ0.5-hole determination value Pref2, it is determined that there is no leakage in the canister 36. As indicated by broken line (t1 to t2), when the internal pressure Pc adjacent to the canister 36 is higher than or equal to the second φ0.5-hole determination value Pref2 (or the first φ0.5-hole determination value Pref1) even when a certain pump driving time has elapsed, it is determined that there is a leakage. When there is a leakage abnormality in this way, the process is ended, and the following leakage diagnosis for the fuel tank 26 (S152) is not carried out.

Note that, when the difference between the φ0.5-hole determination value Pref2 measured for the second time and the φ0.5-hole determination value Pref1 measured for the first time is not sufficiently small as well, the process is ended, and the following leakage diagnosis for the fuel tank 26 (S152) is not carried out.

When it is determined that there is no leakage at the side adjacent to the canister 36 through the above-described leakage diagnosis for the canister 36, the leakage diagnosis process for the fuel tank 26 is executed subsequently (S152). First, the selector valve is switched and the pump in the leakage diagnosis pump module 42 is connected to the side adjacent to the canister 36 without passing through the reference orifice, and the shut-off valve 38a is further opened (t4 to t5). Then, emission of gas is started by the pump in the pump module 42 from the side adjacent to the fuel tank 26 via the canister 36 and the shut-off valve 38a (from t5).

In this state, as indicated by the solid line, the internal pressure Pc is detected by the pressure sensor 42b (t5 to t6). Subsequently, the selector valve is returned to an original state, the atmosphere is drawn by the pump via the reference orifice as a calibration as described above, and a pressure between the pump and the reference orifice is detected by the pressure sensor 42b (t6 to t7). By so doing, a third φ0.5-hole determination value Pref3 is detected.

The φ0.5-hole determination value Pref3 measured for the third time is compared with an attained value (t6) of the internal pressure Pc measured by reducing the pressure adjacent to the fuel tank 26 immediately before. As indicated by the solid line, when the attained value (t6) of the internal pressure Pc is lower than the third φ0.5-hole determination value Pref3, it is determined that there is no leakage in the fuel tank 26.

As indicated by broken line (t5 to t6), when the internal pressure Pc adjacent to the fuel tank 26 is higher than or equal to the third φ0.5-hole determination value Pref3 even when a certain pump driving time has elapsed, it is determined that there is a leakage in the fuel tank 26.

In this way, when the leakage diagnosis process for the canister (S150) and the leakage diagnosis process for the fuel tank (S152) end, the state of the purged fuel concentration update history flag is subsequently determined (S154). That is, it is determined whether the current leakage diagnosis process is a first leakage diagnosis after the purged fuel concentration is updated.

Here, it is the first leakage diagnosis process, and the purged fuel concentration update history flag is set in the ON state, so the process directly exits. After that, until the leakage diagnosis condition is newly satisfied, negative determination is made in step S136.

When the tank internal pressure Ptf is lower than L or the tank internal pressure Ptf is higher than H in step S148 (NO in S148), there is no possibility that a leakage is occurring in the fuel tank 26 as described above, so it is determined that there is no leakage in the fuel tank 26 (S172).

Figure 6:
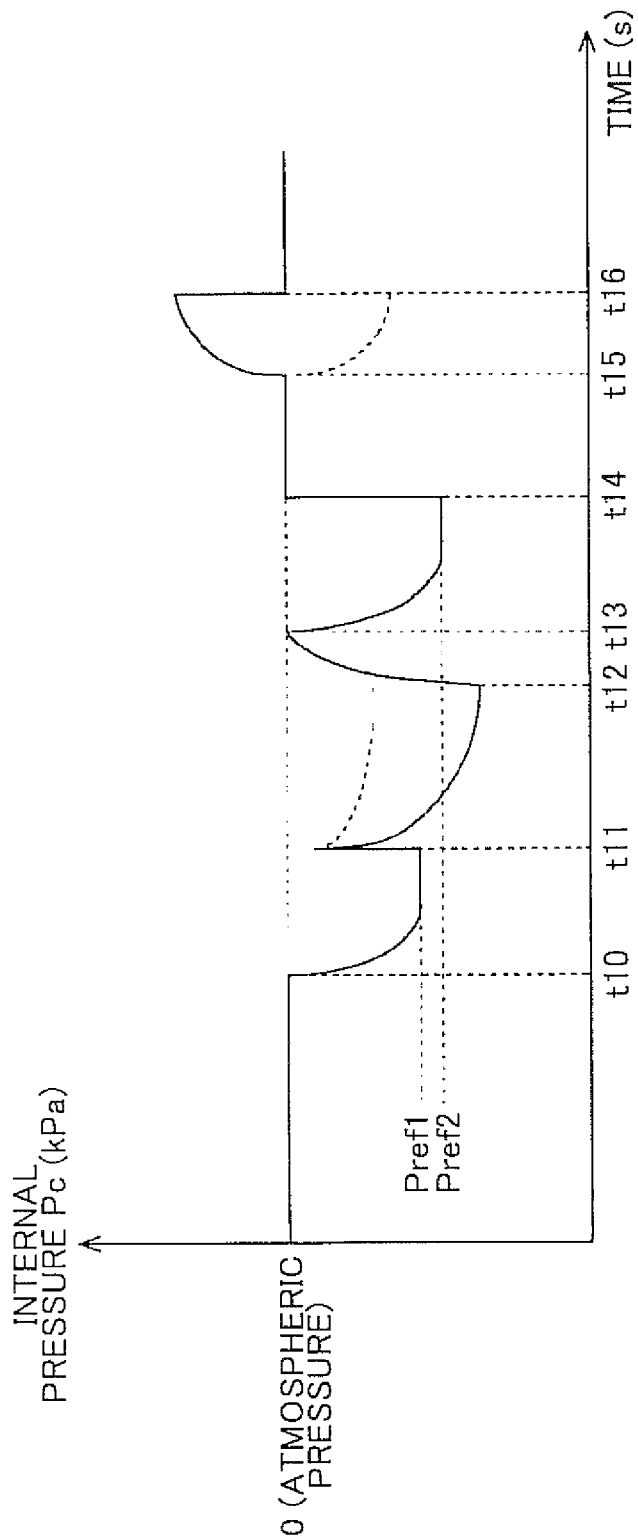
FIG. 6 is a timing chart that shows an example of the leakage diagnosis process in the case where the tank internal pressure is apart from atmospheric pressure.

Subsequently, the leakage diagnosis process for the canister 36 is executed (S174). As shown in FIG. 6, the leakage diagnosis process for the canister executes the same process as the above-described leakage diagnosis process for the canister in step S150.

That is, a calibration is performed by the pump in the leakage diagnosis pump module 42 with the use of the reference orifice having a diameter of 0.5 mm, and a pressure between the pump and the reference orifice is detected by the pressure sensor 42*b* as a φ0.5-hole determination value Pref1 (t10 to t11).

Subsequently, by switching the selector valve, gas is emitted from the canister 36 toward the atmosphere without passing through the reference orifice (t11 to t12). In this state, as indicated by the solid line, the internal pressure Pc adjacent to the canister 36 is detected by the pressure sensor 42*b*.

After that, the selector valve is returned to an original state, and the atmosphere is drawn by the pump via the reference orifice again as a calibration. In this state, a pressure between the pump and the reference orifice is detected by the pressure sensor 42*b* (t13 to t14). By so doing, a second φ0.5-hole determination value Pref2 is detected.

When a difference between the φ0.5-hole determination value Pref2 measured for the second time and the φ0.5-hole determination value Pref1 measured for the first time is sufficiently small, the φ0.5-hole determination value Pref2 measured for the second time is compared with an attained value (t12) of the internal pressure Pc measured by reducing the pressure adjacent to the canister 36 just before.

As indicated by the solid line, when the attained value (t12) of the internal pressure Pc is lower than the second φ0.5-hole determination value Pref2, it is determined that there is no leakage in the canister 36. As indicated by broken line (t11 to t12), when the internal pressure Pc adjacent to the canister 36 is higher than or equal to the second φ0.5-hole determination value Pref2 even when a certain pump driving time has elapsed, it is determined that there is a leakage. When there is a leakage abnormality in this way, the process is ended, and the following shut-off valve stuck determination process (S176) is not executed.

Note that, when the difference between the φ0.5-hole determination value Pref2 measured for the second time and the φ0.5-hole determination value Pref1 measured for the first time is not sufficiently small as well, the process is ended, and the following shut-off valve stuck determination process (S176) is not executed.

When it is determined that there is no leakage at the side adjacent to the canister 36, the shut-off valve stuck determination process is executed subsequently (S176). First, the inside of the canister 36 is set to atmospheric pressure after a stop of the pump, and then the atmosphere open valve 42*a* is closed (t14 to t15). Then, the shut-off valve 38*a* in a valve closed state is opened by a valve open signal (t15 to t16). In this state, the internal pressure Pc is detected by the pressure sensor 42*b* (t15 to t16).

Because negative determination is made in step S148, the tank internal pressure Ptf is different from atmospheric pressure by a certain value or above. Therefore, when the shut-off valve 38*a* is normally opened by the valve open signal from the ECU 70, clear fluctuations occur in the internal pressure Pc of the canister 36, that is, the internal pressure Pc of the canister 36 increases as indicated by the solid line or decreases as indicated by the broken line.

When there are no clear fluctuations, it is determined that the shut-off valve 38*a* has a stuck abnormality, the process ends, and the following determination as to the state of the purged fuel concentration update history flag (S178) is not carried out. When there are clear fluctuations, it is determined that the shut-off valve has no stuck abnormality, and the state of the purged fuel concentration update history flag is determined subsequently (S178). That is, it is determined whether the current leakage diagnosis process is the first leakage diagnosis after the purged fuel concentration is updated.

Here, the purged fuel concentration update history flag is set in the ON state, that is, it is the first leakage diagnosis process, so the process directly exits. Thus, after that, until the leakage diagnosis condition is newly satisfied, negative determination is made in step S136.

In the above-described first leakage diagnosis after the purged fuel concentration is updated, it is assumed that the vehicle enters the READY-ON state again without detecting a leakage abnormality. Then, description will be made on the assumption that only EV travelling is carried out in the READY-ON state and the vehicle enters the READY-OFF state without operation of the internal combustion engine 2.

In this case, in the READY-ON state, the purged fuel concentration update history flag is set to the OFF state (S106) in the leakage diagnosis preliminary process (FIG. 2); however, because of only EV travelling, purge control is not executed. Thus, the purged fuel concentration is not updated and no history thereof is generated, so the vehicle enters the READY-OFF state while the purged fuel concentration update history flag remains in the OFF state.

Therefore, when the leakage diagnosis condition is satisfied, in the leakage diagnosis process (FIG. 3 and FIG. 4), after affirmative determination is made in step S136, the purged fuel concentration update history flag is set in the OFF state in the determination of step S138, so the count threshold Cm is subsequently set on the basis of the purged fuel concentration storage value fp (S144).

Figure 7:
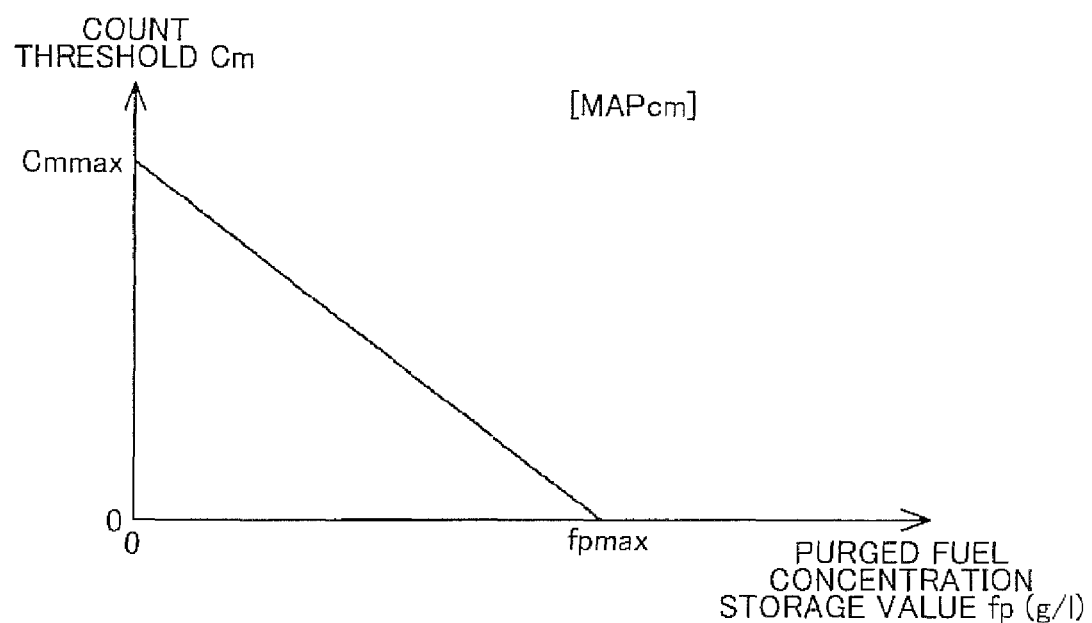
FIG. 7 is a configuration view of a map MAPcm by which a count threshold Cm is set on the basis of a purged fuel concentration storage value fp used in the leakage diagnosis process.

Specifically, a map MAPcm as indicated by the solid line in FIG. 7 is used to set the count threshold Cm. In the map MAPcm, the count threshold Cm is increased as the purged fuel concentration storage value fp (g/l) decreases, and the count threshold Cm is reduced as the purged fuel concentration storage value fp increases. Note that the count threshold Cm is a maximum value Cmmax when the purged fuel concentration storage value fp is 0 (g/l), and the count threshold Cm is 0 when the purged fuel concentration storage value fp is higher than or equal to a limit value fpmax.

Subsequently, it is determined whether the diagnosis execution counter Cx is smaller than the count threshold Cm (S146). The diagnosis execution counter Cx is a counter that increases as a leakage diagnosis is carried out as will be described later.

Figure 2:
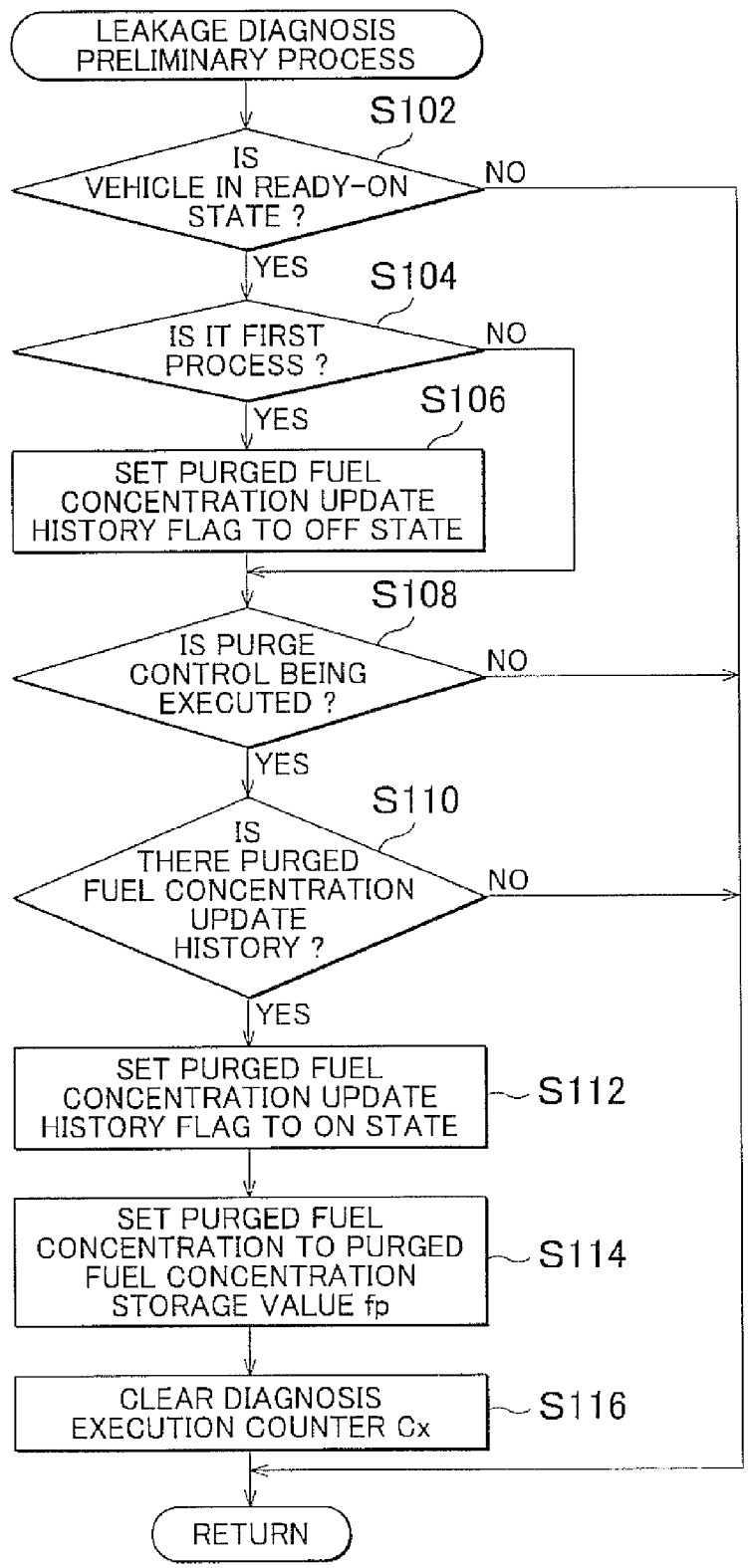
FIG. 2 is a flowchart of a leakage diagnosis preliminary process executed by an ECU according to the first embodiment.

When the purged fuel concentration is updated in the previous READY-ON state, the diagnosis execution counter Cx is cleared (S116) in the above-described leakage diagnosis preliminary process (FIG. 2). Therefore, the diagnosis execution counter Cx is smaller than the count threshold Cm, so affirmative determination is made in step S146, and the leakage diagnosis process in step S148 and the following steps as described with reference to the timing charts of FIG. 5 and FIG. 6 is executed.

When affirmative determination is made in step S148, determination as to the purged fuel concentration update history flag is carried out (S154) after the leakage diagnosis process (S150 and S152). At this time, the purged fuel concentration update history flag is set in the OFF state, that is, it is the second or later leakage diagnosis process after the purged fuel concentration is updated, so step S156 is subsequently executed. Here, as shown by the mathematical expression (2), an accumulated value A is added to the diagnosis execution counter Cx.

$$Cx \leftarrow Cx + A \qquad (2)$$

The accumulated value A corresponds to an amount by which the adsorbent in the canister 36 has adsorbed fuel vapor present in the upper space 26*a* of the fuel tank 26 at the time when gas is emitted from the fuel tank 26 via the canister 36 through the leakage diagnosis process for the fuel tank (S152) executed immediately before. The accumulated value A is preset on the basis of a pressure of fuel vapor present in the upper space 26a of the fuel tank 26 and a period of time (t5 to t6 in FIG. 5) required to execute the leakage diagnosis process for the fuel tank (S152) when the internal combustion engine 2 is stopped for several hours in a steady state.

After that, until the leakage diagnosis condition is newly satisfied, negative determination is made in step S136. When negative determination is made in step S148, determination of step S178 is carried out after determination that there is no leakage in the fuel tank (S172), the leakage diagnosis process for the canister (S174) and the shut-off valve stuck determination process (S176). In this determination, the purged fuel concentration update history flag is set in the OFF state, that is, it is the second or later leakage diagnosis process after the purged fuel concentration is updated, so, in current determination in step S178, it is subsequently determined whether the tank internal pressure Ptf is higher than the upper limit value H (S180). At this time, in step S148, the tank internal pressure Ptf is lower than the lower limit value L or the tank internal pressure Ptf is higher than the upper limit value H.

If the tank internal pressure Ptf is lower than the lower limit value L, the shut-off valve 38a is opened, and gas moves from the side adjacent to the canister 36 to the side adjacent to the fuel tank 26, so the amount of fuel adsorbed in the canister 36 does not increase. However, when the tank internal pressure Ptf is higher than the upper limit value H, high-pressure fuel vapor is introduced from the side adjacent to the fuel tank 26 to the side adjacent to the canister 36, so the amount of fuel adsorbed in the canister 36 increases.

Thus, when the tank internal pressure Ptf is not higher than the upper limit value H (NO in S180), the process directly exits. After that, until the leakage diagnosis condition is newly satisfied, negative determination is made in step S136.

When the tank internal pressure Ptf is higher than the upper limit value H (YES in S180), an accumulated value B is added to the diagnosis execution counter Cx as shown by the mathematical expression (3) (S182).

$$Cx \leftarrow Cx + B \quad (3)$$

The accumulated value B is preset in correspondence with the amount of fuel vapor introduced from the side adjacent to the fuel tank 26 to the side adjacent to the canister 36 through the shut-off valve stuck determination process (S176) executed immediately before. Note that the above-described accumulated value A is larger than the accumulated value B.

After that, until the leakage diagnosis condition is newly satisfied, negative determination is made in step S136. FIG. 8 shows an example of the process according to the present embodiment. The vehicle enters the READY-ON state (t20), and, after that, operation of the internal combustion engine 2 is started (t21). Purge control is started during operation of the internal combustion engine (t22), and learning in air-fuel ratio feedback control is started.

When a learning value reaches a highly accurate state through a repetition of learning (t23), the purged fuel concentration is updated, so there is a purged fuel concentration update history (FIG. 2, YES in S110). Thus, the purged fuel concentration update history flag is set to the ON state (S112), a newly calculated purged fuel concentration is set for the purged fuel concentration storage value fp (S114), and the diagnosis execution counter Cx is cleared (Cx=0) (S116).

After that, the vehicle enters the READY-OFF state, and the internal combustion engine also stops (t24). When the leakage diagnosis condition is satisfied during a stop of the internal combustion engine (t25), the purged fuel concentration update history flag is set in the ON at this time, so it is determined in the leakage diagnosis process (FIG. 3 and FIG. 4) whether the purged fuel concentration storage value fp is higher than the reference concentration (S140). When the purged fuel concentration storage value fp is lower than or equal to the reference concentration (NO in S140), the leakage diagnosis process as described in FIG. 5 or FIG. 6 is executed in step S148 and the following steps (t25 to t26).

The leakage diagnosis process is executed in a state where the purged fuel concentration update history flag is set in the ON state, so step S156 and step S182 are not executed. Thus, the diagnosis execution counter Cx is not counted up but Cx remains 0 at the time when the leakage diagnosis process ends (t26).

Subsequently, the vehicle enters the READY-ON state (t27), and the purged fuel concentration update history flag returns to the OFF state (S106). During a period in the READY-ON state (t27 to t28), only EV travelling is performed, the internal combustion engine is stopped, and no purge control is executed. Therefore, the purged fuel concentration update history flag remains in the OFF state.

After that, the vehicle enters the READY-OFF state (t28), and the leakage diagnosis condition is satisfied (t29). Because the purged fuel concentration update history flag is set in the OFF state at this time, a new count threshold Cm is calculated (S144) on the basis of the purged fuel concentration storage value fp stored at the timing t23 in the leakage diagnosis process (t29 to t30). Then, the count threshold Cm is compared with the diagnosis execution counter Cx (S146).

At the previous timing t23, the purged fuel concentration storage value fp higher than the purged fuel concentration storage value fp stored before then is stored. Therefore, on the basis of the correlation of the map MAPcm (FIG. 7), the count threshold Cm set at the timing t29 is slightly smaller than that till then.

Here, the diagnosis execution counter Cx is 0, and it is determined that Cx is smaller than Cm (YES in S146), so, in the process in step S148 and the following steps, the leakage diagnosis process as described in FIG. 5 or FIG. 6 is executed (t29 to t30). Note that, at this time, the above-described inequality (1) is satisfied (YES in S148), and the leakage diagnosis process (S150 and S152) described in FIG. 5 is executed.

After the leakage diagnosis process, the purged fuel concentration update history flag is set in the OFF state, so the diagnosis execution counter Cx is counted up by the accumulated value A through the mathematical expression (2) (S156, t30).

During a subsequent READY-ON period (t31 to t32) as well, only EV travelling is performed, the internal combustion engine is stopped, and no purge control is executed. Therefore, the purged fuel concentration update history flag is kept in the OFF state, and is not set to the ON state.

After that, the vehicle enters the READY-OFF state (t32), and the leakage diagnosis condition is satisfied (t33). Because the purged fuel concentration update history flag is set in the OFF state at this time, a count threshold Cm is calculated (S144) on the basis of the purged fuel concentration storage value fp stored at the timing t23 in the leakage diagnosis process (t33 to t34). Then, the count threshold Cm is compared with the diagnosis execution counter Cx (S146).

Here, the diagnosis execution counter Cx is A but Cx is smaller than Cm (YES in S146), so, in the process in step S148 and the following steps, the leakage diagnosis process as described in FIG. 5 or FIG. 6 is executed (t33 to t34). Note that when the tank internal pressure Ptf is higher than the upper limit value H at this time, the above-described inequality (1) is not satisfied (NO in S148). Thus, the leakage diagnosis process (S174) described in FIG. 6 and the shut-off valve stuck determination process (S176) are executed.

After the processes, the purged fuel concentration update history flag is set in the OFF state (S178) and the tank internal pressure Ptf is higher than the upper limit value H (YES in S180), so the diagnosis execution counter Cx is counted up by the accumulated value B through the mathematical expression (3) (S182, t34).

After that, the vehicle enters the READY-ON state (t35 to t39). In the READY-ON state, the internal combustion engine 2 is operated in HV travelling (t36 to t39). During operation of the internal combustion engine, purge control is started (t37), and learning in air-fuel ratio feedback control is started.

When a learning value reaches a highly accurate state through a repetition of learning (t38), the purged fuel concentration is updated, so there is a purged fuel concentration update history (YES in S110). Thus, the purged fuel concentration update history flag is set to the ON state (S112), a newly calculated purged fuel concentration is set for the purged fuel concentration storage value fp (S114), and the diagnosis execution counter Cx is cleared (Cx=0) (S116).

After that, the vehicle enters the READY-OFF state, and the internal combustion engine also stops (t39). When the leakage diagnosis condition is satisfied during a stop of the internal combustion engine (t40), the purged fuel concentration update history flag is set in the ON state at this time, so it is determined in the leakage diagnosis process (FIG. 3 and FIG. 4) whether the purged fuel concentration storage value fp is higher than the reference concentration (S140). When the purged fuel concentration storage value fp is lower than or equal to the reference concentration (NO in S140), the leakage diagnosis process as described in FIG. 5 or FIG. 6 is executed in step S148 and the following steps (t40 to t41).

The leakage diagnosis process is executed in a state where the purged fuel concentration update history flag is set in the ON state, so step S156 and step S182 are not executed. Thus, the diagnosis execution counter Cx is not counted up but Cx remains 0 at the time when the leakage diagnosis process ends.

Subsequently, the vehicle enters the READY-ON state (t42), and the purged fuel concentration update history flag returns to the OFF state (S106). During a period in the READY-ON state (t42 to t43), only EV travelling is performed, the internal combustion engine is stopped, and no purge control is executed. Therefore, the purged fuel concentration update history flag remains in the OFF state.

After that, the vehicle enters the READY-OFF state (t43), and the leakage diagnosis condition is satisfied (t44). Because the purged fuel concentration update history flag is set in the OFF state at this time, a count threshold Cm is calculated (S144) on the basis of the purged fuel concentration storage value fp stored at the timing t38 in the leakage diagnosis process (t44 to t45). Then, the count threshold Cm is compared with the diagnosis execution counter Cx (S146), and it is determined whether to actually execute the leakage diagnosis process (the process in S148 and the following steps).

In the example of FIG. 8, at timing t38, a value lower than the purged fuel concentration storage value fp stored at the previous timing t23 is stored as the purged fuel concentration storage value fp. Therefore, the count threshold Cm set at timing t44 on the basis of the correlation of the map MAPcm (FIG. 7) is slightly larger than that before then.

After that, the count threshold Cm varies on the basis of the storage value fp each time the purged fuel concentration is updated. Then, at the time of a leakage diagnosis, other than the first leakage diagnosis immediately after the purged fuel concentration is updated, the diagnosis execution counter Cx is compared with the count threshold Cm to determine whether to actually carry out a leakage diagnosis. Note that, in the example of FIG. 8, Cx is not larger than or equal to Cm, so a leakage diagnosis is carried out.

FIG. 9 shows an example in which Cx becomes larger than or equal to Cm. From timing t50 to timing t65, changes are the same as those from timing t20 to timing t35 in FIG. 8. The vehicle enters the READY-ON state at timing t65; however, during the READY-ON period (t65 to t66), only EV travelling is performed, and the internal combustion engine remains stopped. Thus, no purge control is executed, so the purged fuel concentration is not updated. Therefore, the purged fuel concentration update history flag remains in the OFF state, and the diagnosis execution counter Cx is kept.

Subsequently, the vehicle enters the READY-OFF state (t66), and the leakage diagnosis condition is satisfied (t67). In the leakage diagnosis process (t67 to t68) at this time, the count threshold Cm is calculated from the purged fuel concentration storage value fp stored at timing t53 (S144), and the count threshold Cm is compared with the diagnosis execution counter Cx. Here, the diagnosis execution counter Cx is still smaller than Cm (YES in S146), the leakage diagnosis process is actually executed in the process in step S148 and the following steps.

The leakage diagnosis process (t67 to t68) at this time is a process in a state where the purged fuel concentration update history flag is set in the OFF state, so, except the case where the tank internal pressure Ptf is smaller than the lower limit value L, the diagnosis execution counter Cx is counted up (S156 or S182).

In the example shown in FIG. 9, the count-up process of step S156 is executed, and the accumulated value A is added to the diagnosis execution counter Cx (t68). As a result, Cx becomes larger than or equal to Cm. After that, the vehicle enters the READY-ON state (t69). During the READY-ON period (t69 to t70) as well, only EV travelling is performed, and the internal combustion engine remains stopped Thus, no purge control is executed, so the purged fuel concentration is not updated. Therefore, the purged fuel concentration update history flag remains in the OFF state, and the diagnosis execution counter Cx is kept.

After that, the vehicle enters the READY-OFF state (t70), and the leakage diagnosis condition is satisfied (t71). When Cx is smaller than Cm, the leakage diagnosis process (t71 to t72) is executed as indicated by the broken line; however, because Cx is larger than or equal to Cm here (NO in S146), the leakage diagnosis process in step S148 and the following steps is not executed.

After that, as shown in FIG. 10, as long as a state where only EV travelling is performed without operating the internal combustion engine in the READY-ON state continues (t80 to t85), the relationship that Cx is larger than or equal to Cm does not change, so, even when the leakage diagnosis condition is satisfied, the leakage diagnosis process is not actually executed.

After the state where Cx is larger than or equal to Cm continues, the vehicle enters the READY-ON state (t86), and the internal combustion engine is operated (t87 to t90) during the READY-ON period (t86 to t90). During the operation of the internal combustion engine, the purged fuel concentration is updated (t89) through learning in air-fuel ratio feedback control (from t88). Therefore, the purged fuel concentration update history flag is set to the ON state, the updated purged fuel concentration is stored as the purged fuel concentration storage value fp, and the diagnosis execution counter Cx is cleared.

Then, during the immediate READY-OFF period (t90 to t93), when the new purged fuel concentration storage value fp is lower than or equal to the reference concentration (NO in S140), the leakage diagnosis process as described in FIG. 5 or FIG. 6 is executed in step S148 and the following steps (t81 to t92).

When it is assumed that only EV travelling is performed during a subsequent READY-ON period (t93 to t94), the count threshold Cm is calculated from the purged fuel concentration storage value fp updated at timing t89 in the leakage diagnosis process (t95 to t96) in a subsequent READY-OFF state (t95, S144).

In the example of FIG. 10, the purged fuel concentration storage value fp is updated to a considerably high level, so the count threshold Cm is set to a small value (t95). Then, Cx is smaller than Cm (YES in S146), so the leakage diagnosis shown in FIG. 5 or FIG. 6 is carried out (t95 to t96).

After that, when the leakage diagnosis condition is satisfied without updating the purged fuel concentration storage value fp, the purged fuel concentration storage value fp remains unchanged, so the diagnosis execution counter Cx is determined on the basis of the same count threshold Cm. By so doing, it is determined whether to execute the leakage diagnosis process.

In the above-described configuration, the ECU 70 corresponds to an evaporative fuel processing mechanism leakage diagnosis device (a leakage diagnosis device). The process of calculating a purged fuel concentration from a control deviation amount in air-fuel ratio in air-fuel ratio feedback control corresponds to a process that serves as a canister fuel adsorption state detecting unit (a detecting unit). The leakage diagnosis preliminary process (FIG. 2) and the leakage diagnosis process (FIG. 3 and FIG. 4) respectively correspond to a process that serves as a leakage diagnosis count threshold setting unit (a setting unit) and a process that serves as a leakage diagnosis repeating unit.

Advantageous Effects of First Embodiment (1) The purged fuel concentration calculated as a learning value through air-fuel ratio feedback control in the ECU 70 is a physical quantity that reflects a fuel adsorption state of the canister 36. Therefore, it is possible to determine the degree of the remaining fuel adsorption capacity of the canister 36 on the basis of the purged fuel concentration. Thus, after the purged fuel concentration is detected, the count threshold Cm that limits the number of times of leakage diagnosis is set on the basis of the purged fuel concentration (S144 in FIG. 3).

The count threshold Cm is set to a value by which, even when the leakage diagnosis process for the fuel tank (S152) as shown in FIG. 5 and FIG. 6 and the shut-off valve stuck determination process (S176) that is a process executed in synchronization with a leakage diagnosis are executed, the number of times of leakage diagnosis is limited such that the canister 36 does not become a saturated state. Thus, a leakage diagnosis is repeated within the number of times limited on the basis of the count threshold Cm, the canister 36 does not become a saturated state, and there is no possibility that erroneous detection of a leakage diagnosis or leakage of fuel vapor to an outside occurs.

The count threshold Cm is set on the basis of the purged fuel concentration stored as the purged fuel concentration storage value fp each time the purged fuel concentration is updated, so it is possible to highly accurately limit the number of times of leakage diagnosis in accordance with the fuel adsorption state of the canister 36. Thus, even when a stop of the internal combustion engine extends over a long period of time, it is possible to increase the frequency of leakage diagnosis without bringing the canister 36 into a saturated state.

(2) Limiting the number of times of leakage diagnosis with the count threshold Cm is performed by comparing (S146) the count threshold Cm with the diagnosis execution counter Cx accumulated (S156, S182) each time the leakage diagnosis process for the fuel tank is executed (S152) or each time the shut-off valve stuck determination process is executed (S176).

Between the leakage diagnosis process for the fuel tank (S152) and the shut-off valve stuck determination process (S176), a state of fuel vapor introduced into the canister 36 is different. Therefore, the accumulated values A and B to be added to the diagnosis execution counter Cx each are set on the basis of a fuel vapor introduction state.

In the present embodiment, the shut-off valve 38a for hermetically closing the fuel tank 26 is provided. In the above configuration, in the shut-off valve stuck determination process (S176) that is executed in synchronization with a leakage diagnosis in a state where the internal pressure of the fuel tank 26 is high, when the shut-off valve 38a is opened, fuel vapor is introduced into the canister 36 due to a pressure difference from atmospheric pressure.

The amount of fuel vapor introduced into the canister 36 is larger in the case where a negative pressure is generated in the fuel tank 26 by the pump module 42. Therefore, the accumulated value A added to the diagnosis execution counter Cx after the leakage diagnosis process for the fuel tank (S152) is larger than the accumulated value B added to the diagnosis execution counter Cx after the shut-off valve stuck determination process (S176).

By so doing, it is possible to highly accurately limit the number of times of leakage diagnosis in the leakage diagnosis process (FIG. 3 and FIG. 4), and it is possible to increase the frequency of leakage diagnosis without bringing the canister 36 into a saturated state.

(3) The purged fuel concentration used as a physical quantity that reflects the fuel adsorption state of the canister 36 is detected on the basis of a control deviation amount in air-fuel ratio, learned in air-fuel ratio feedback control executed during purging. Therefore, it is possible to detect the purged fuel concentration without providing a special sensor, or the like.

(4) In the case of a hybrid vehicle, a stop of the internal combustion engine may extend over a long period of time due to EV travelling. In the present embodiment, the vehicle is a plug-in hybrid vehicle, so the opportunity of operating the internal combustion engine tends to extremely reduce.

However, it is possible to repeat a leakage diagnosis within the number of times the canister 36 does not become a saturated state as described above, so, even when a stop of the internal combustion engine extends over a long period of time, it is possible to increase the frequency of leakage diagnosis without bringing the canister 36 into a saturated state.

Second Embodiment

Configuration of Second Embodiment

Figure 11A:
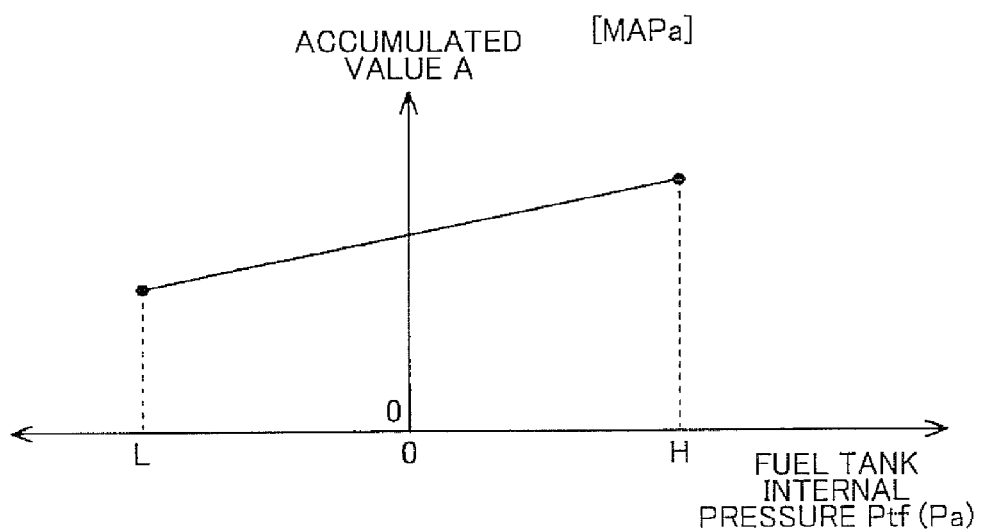
FIG. 11A and FIG. 11B are configuration views of maps MAPa and MAPb by which accumulated values A and B are set on the basis of a tank internal pressure Ptf used in a second embodiment.
Figure 11B:
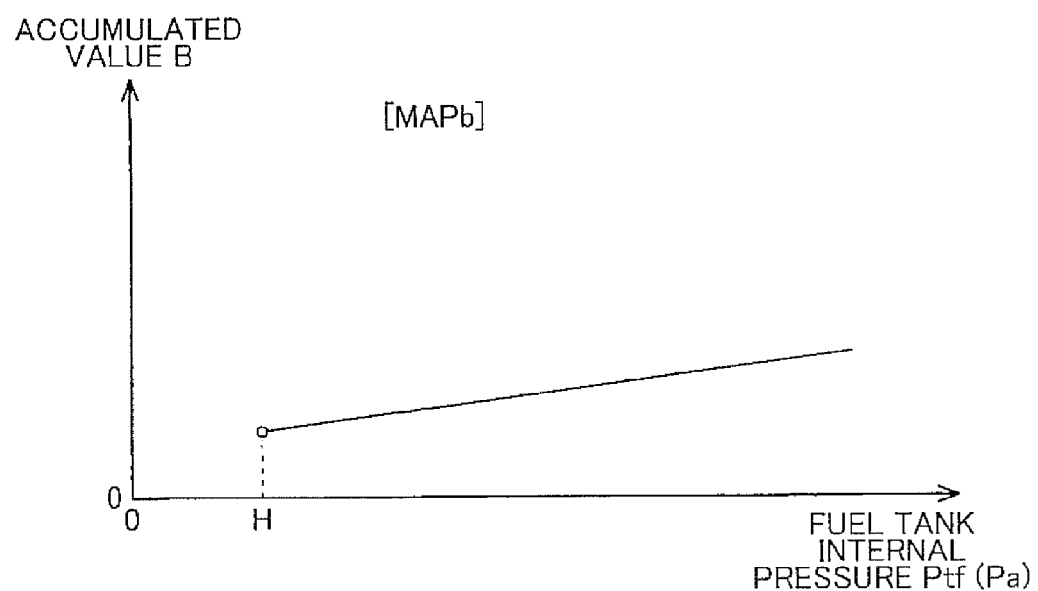

In the present embodiment, the accumulated value A in step S156 and the accumulated value B in step S182 in the leakage diagnosis process (FIG. 3 and FIG. 4) are obtained from maps as shown in FIG. 11A and FIG. 11B.

The map MAPa shown in FIG. 11A is used to obtain the accumulated value A on the basis of the tank internal pressure Ptf immediately before the leakage diagnosis process for the fuel tank, and is set within the range from the lower limit value L to the upper limit value H.

The map MAPb shown in FIG. 11B is used to obtain the accumulated value B on the basis of the tank internal pressure Ptf immediately before the shut-off valve stuck determination process, and is set within the range higher than the upper limit value H.

Operation of Second Embodiment

The case where the accumulated value A is accumulated in the diagnosis execution counter Cx (S156) is the case where the tank internal pressure Ptf falls between the lower limit value L and the upper limit value H at the time of a start of a leakage diagnosis. When the tank internal pressure Ptf is close to the lower limit value L (<0 (Pa)), a fuel vapor pressure in the upper space 26a of the fuel tank 26 is low. Thus, in step S152, when gas in the fuel tank 26 is drawn by the pump module 42 via the opened shut-off valve 38a, the amount of fuel vapor introduced into the canister 36 is small.

When the tank internal pressure Ptf is close to the upper limit value H (>0 (Pa)), a fuel vapor pressure in the upper space 26a of the fuel tank 26 is higher than that when the tank internal pressure Ptf is close to the lower limit value L. Thus, in step S152, when gas in the fuel tank 26 is drawn by the pump module 42 via the opened shut-off valve 38a, the amount of fuel vapor introduced into the canister 36 is large.

Thus, in the map MAPa of FIG. 11A, the accumulated value A is set so as to be larger in the range close to the upper limit value H than in the range closer to the lower limit value L. When the accumulated value B is accumulated in the diagnosis execution counter Cx (S182), the tank internal pressure Ptf is higher than the upper limit value H. Therefore, when the shut-off valve 38a is opened, fuel vapor is introduced from the side adjacent to the fuel tank 26 into the canister 36 due to a pressure difference from atmospheric pressure.

As the tank internal pressure Ptf increases, a fuel vapor pressure increases. Therefore, the amount of fuel vapor introduced into the canister 36 by opening the shut-off valve 38a increases as the tank internal pressure Ptf increases. Thus, in the map MAPb of FIG. 11B, the accumulated value B is set so as to be larger as the tank internal pressure Ptf increases in the range in which the tank internal pressure Ptf is higher than the upper limit value FT.

In this way, in the map MAPa of FIG. 11A and the map MAPb of FIG. 11B, the accumulated values A and B are set with weights in correspondence with the amount of fuel vapor introduced into the canister 36.

The amount of fuel vapor introduced from the fuel tank 26 into the canister 36 is larger in the leakage diagnosis process for the fuel tank (S152) in which a negative pressure is introduced into the fuel tank 26 by the pump module 42 than in the shut-off valve stuck determination process (S176). Therefore, between the map MAPa of FIG. 11A and the map MAPb of FIG. 11B, the accumulated value A is generally set to a larger value than the accumulated value B. A correspondence relationship with the aspect of the invention is the same as that of the first embodiment.

Advantageous Effects of Second Embodiment (1) The advantageous effects of the first embodiment are obtained, and, the accumulated values A and B are set in further details with the use of the maps MAPa and MAPb, so it is possible to further highly accurately limit the number of times of leakage diagnosis.

Third Embodiment
Configuration of Third Embodiment

Figure 12:
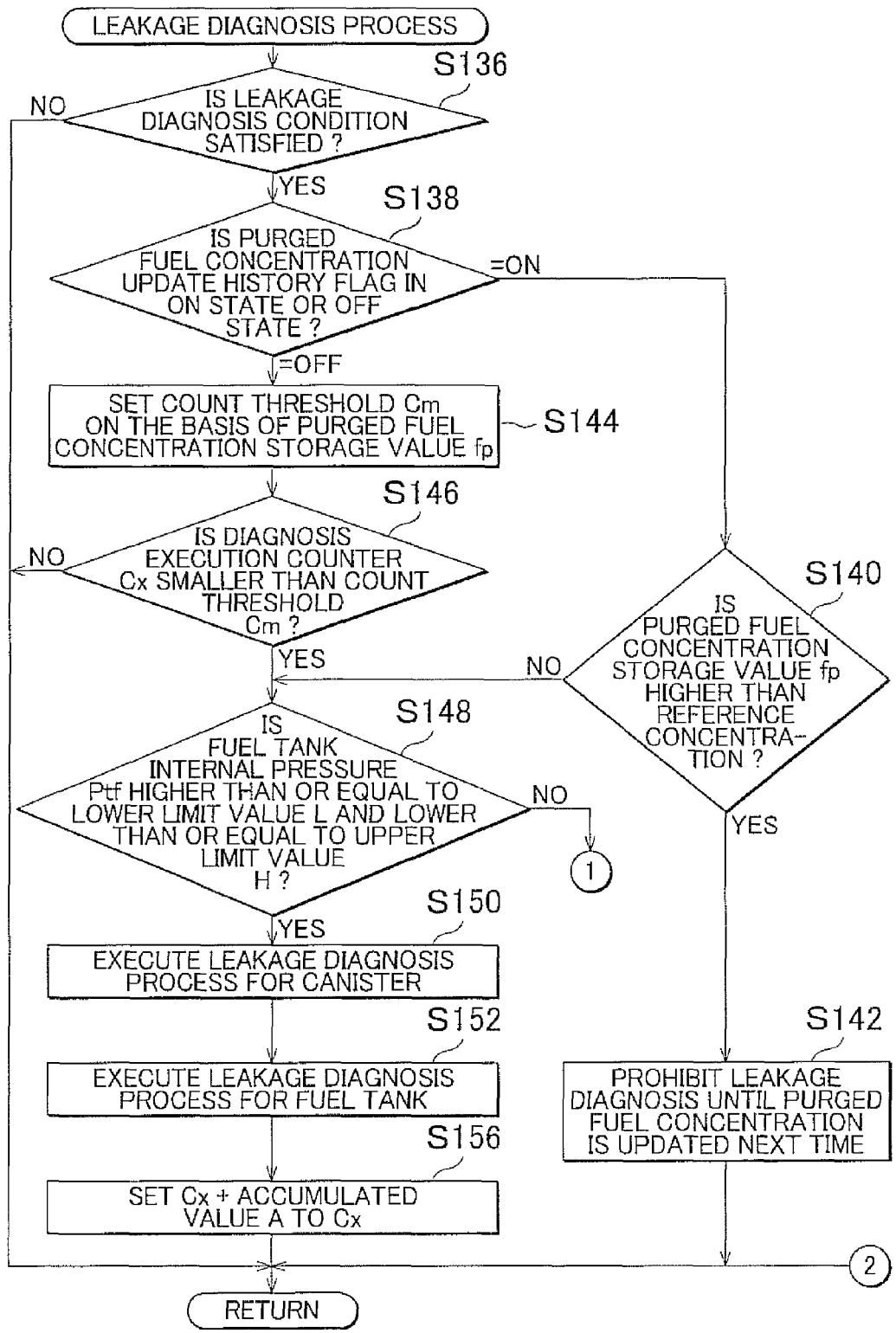
FIG. 12 is a flowchart of a leakage diagnosis process according to a third embodiment.
Figure 13:
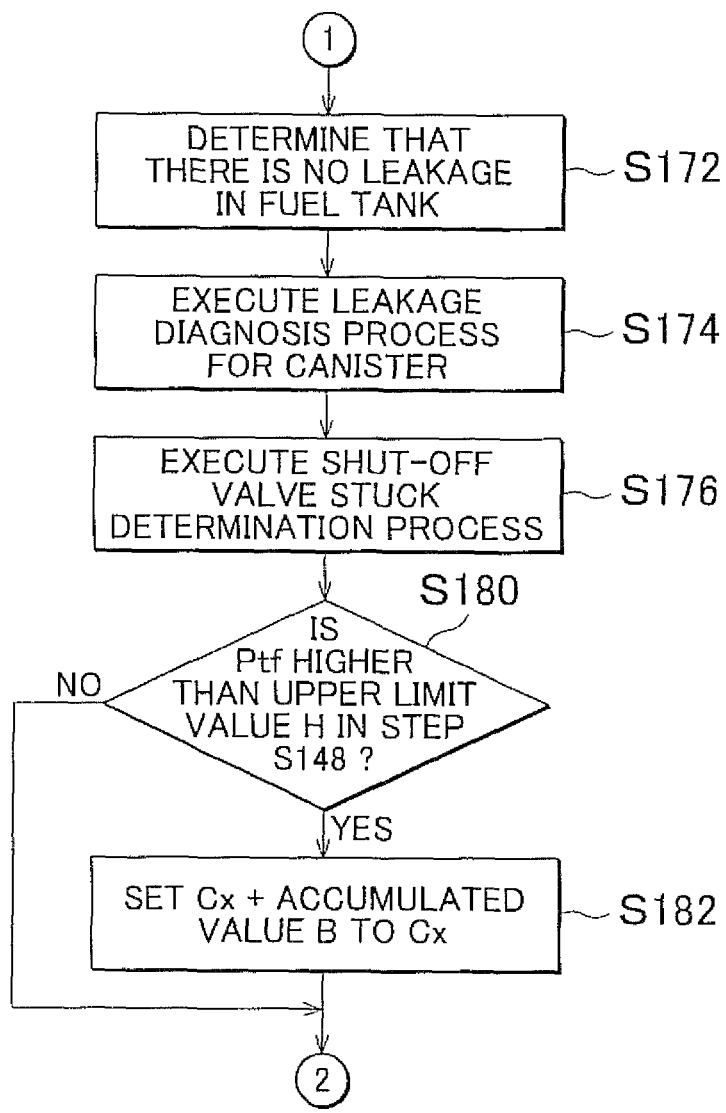
FIG. 13 is a flowchart of the leakage diagnosis process according to the third embodiment.

In the present embodiment, instead of the leakage diagnosis process (FIG. 3 and FIG. 4) according to the first embodiment, a leakage diagnosis process shown in FIG. 12 and FIG. 13 is executed. The other configuration is basically the same as that of the first embodiment or second embodiment.

Figure 3:
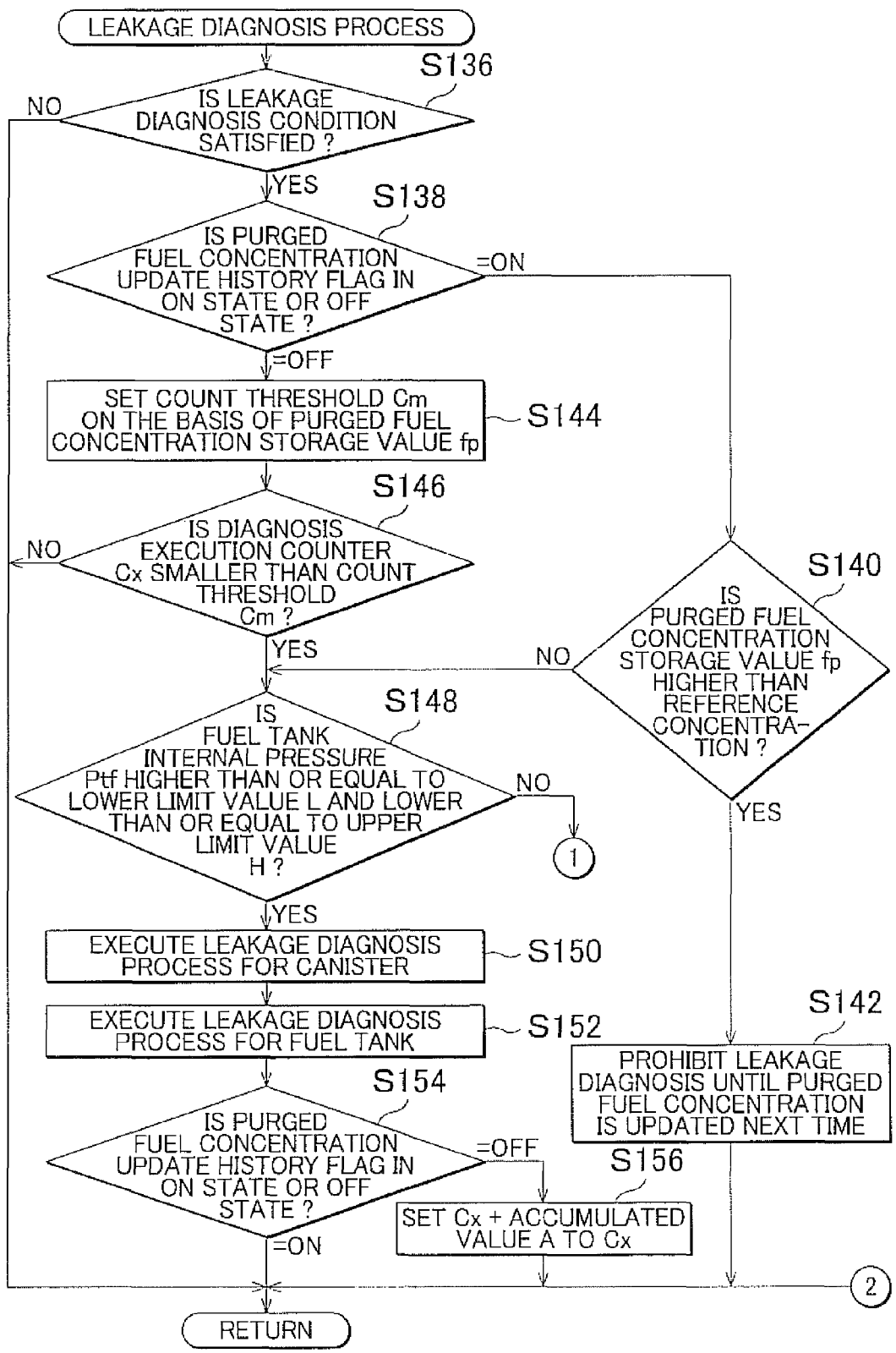
FIG. 3 is a flowchart of a leakage diagnosis process executed by the ECU according to the first embodiment.
Figure 4:
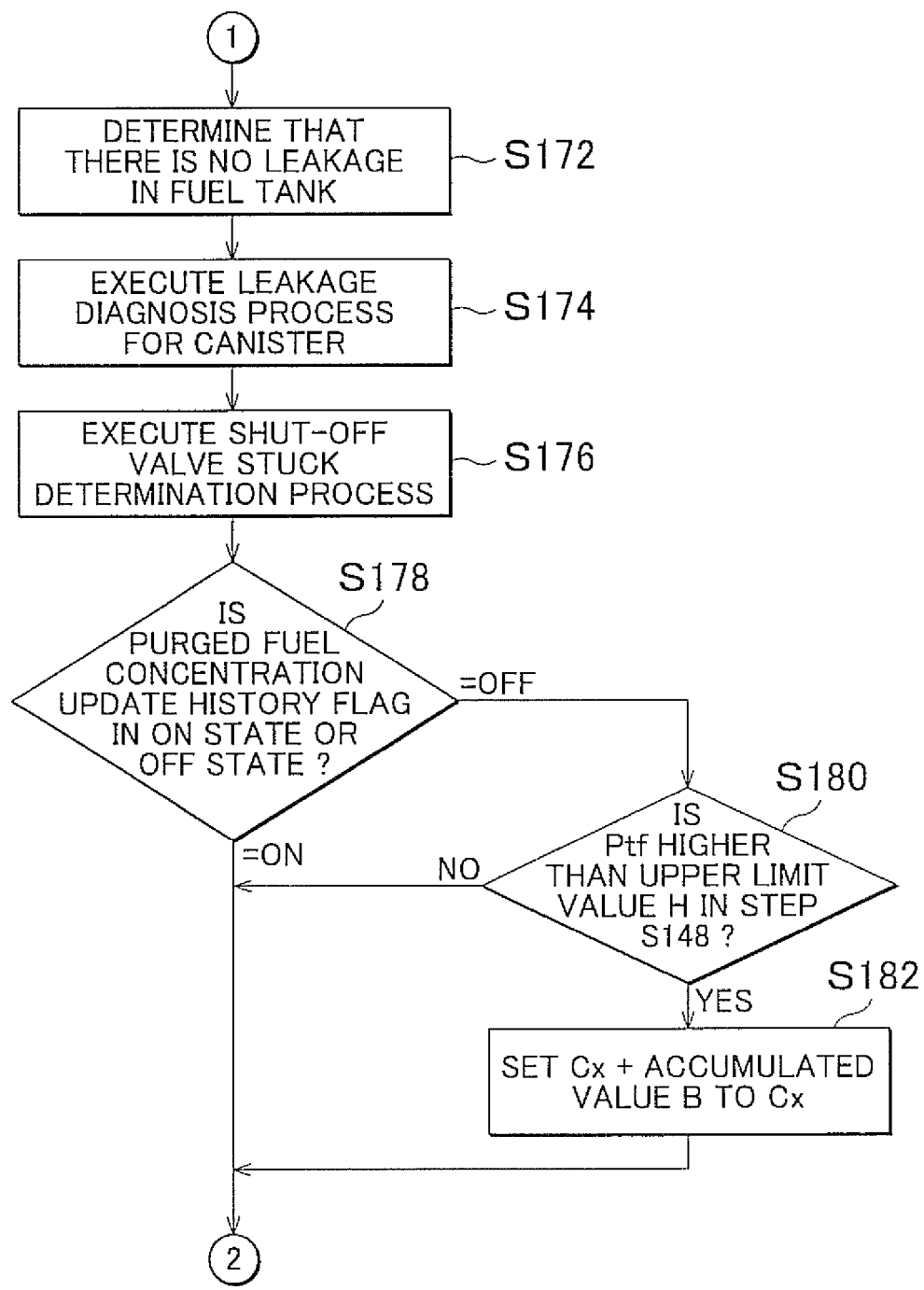
FIG. 4 is a flowchart of the leakage diagnosis process executed by the ECU according to the first embodiment.

The leakage diagnosis process shown in FIG. 12 and FIG. 13 differs from the leakage diagnosis process shown in FIG. 3 and FIG. 4 in that steps S154 and S178 in FIG. 3 and FIG. 4 are not present in FIG. 12 and FIG. 13. By so doing, in FIG. 12, after the leakage diagnosis process for the fuel tank (S152), the diagnosis execution counter Cx is definitely counted up by the accumulated value A (S156). In FIG. 13, determination of step S180 is definitely carried out after the shut-off valve stuck determination process (S176), and, when the tank internal pressure Ptf is higher than the upper limit value H (YES in S180), the diagnosis execution counter Cx is counted up by the accumulated value B (S182).

Operation of Third Embodiment

Figure 14:
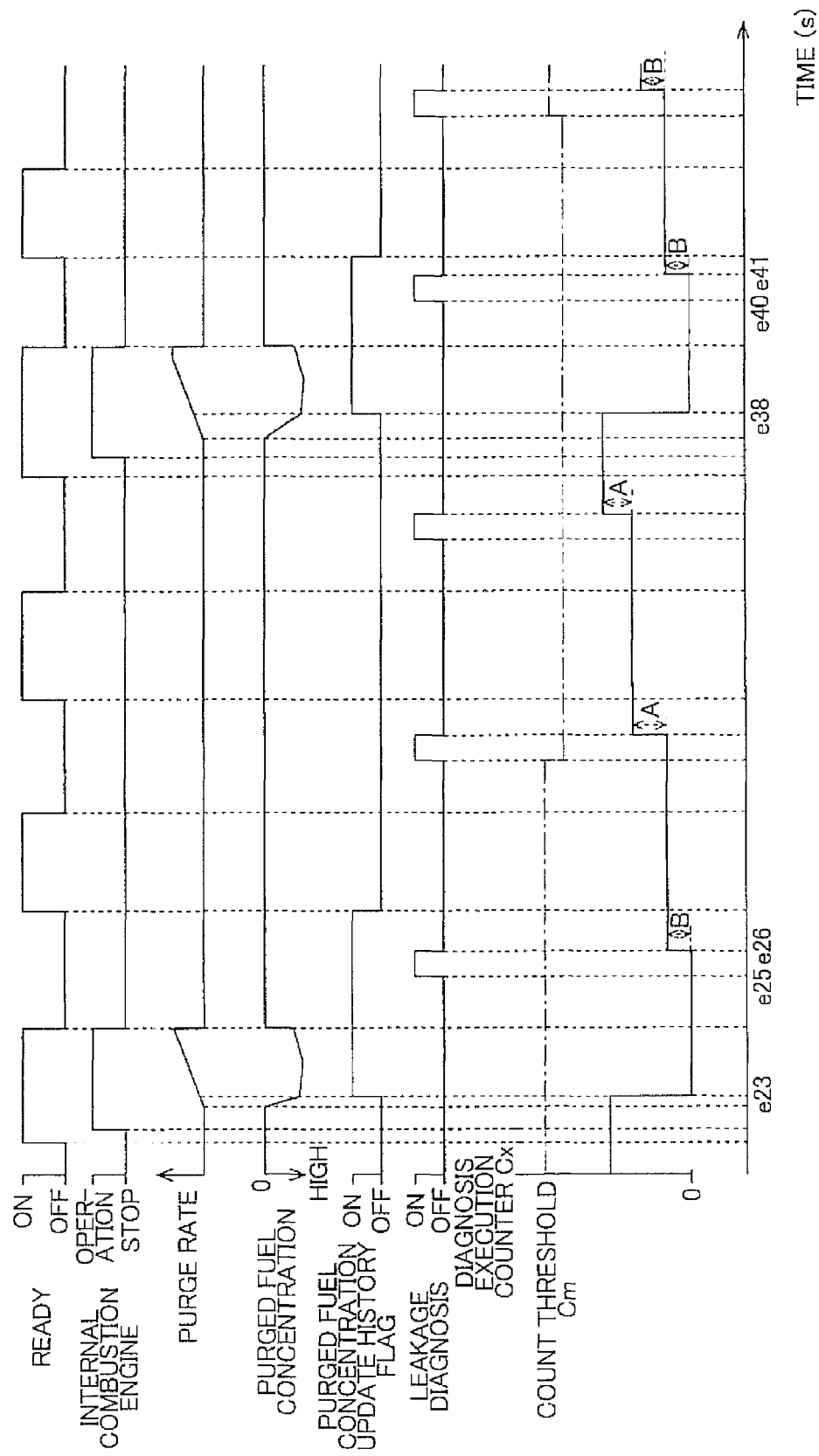
FIG. 14 is a timing chart that shows an example of control according to the third embodiment.

Through the leakage diagnosis process shown in FIG. 12 and FIG. 13, as shown in FIG. 14, even at the time of a leakage diagnosis (e25 to e26, e40 to e41) immediately after the purged fuel concentration is updated (e23, e38), the diagnosis execution counter Cx is counted up in correspondence with a leakage diagnosis or the details of a process in synchronization with the leakage diagnosis (e26, e41).

Note that, in correspondence with the fact that the diagnosis execution counter Cx is counted up at the time of a leakage diagnosis even immediately after the purged fuel concentration is updated in this way, values of the map MAPcm (FIG. 7) or the accumulated values A and B and values of the maps MAPa and MAPb (FIG. 11) are adjusted. A correspondence relationship with the aspect of the invention is the same as that of the first embodiment.

Advantageous Effects of Third Embodiment (1) The advantageous effects of the first or second embodiment are obtained, and, even immediately after the purged fuel concentration is updated, the amount of fuel vapor introduced into the canister 36 is reflected on the diagnosis execution counter Cx, so it is possible to further highly accurately limit the number of times of leakage diagnosis.

Alternative Embodiments

In the above-described embodiments, it is determined whether to repeatedly carry out a leakage diagnosis by comparing the diagnosis execution counter Cx with the count threshold Cm. Instead of such a counter, the number of times of diagnosis is directly set on the basis of a purged fuel concentration and a diagnosis is carried out within the set number of times.

In the second embodiment, the accumulated values A and B are set on the basis of the tank internal pressure Ptf; however, because a fuel vapor pressure correlates with a temperature, the accumulated values A and B may be set on the basis of a fuel temperature Tf detected by the fuel temperature sensor 28a. The same applies to the third embodiment.

What is claimed is:

1. A leakage diagnosis device that carries out a leakage diagnosis on the basis of an internal pressure state of an airtight compartment by emitting gas from the compartment via a canister during a stop of an internal combustion engine, the compartment being formed in an evaporative fuel processing mechanism for the internal combustion engine, the evaporative fuel processing mechanism including a fuel tank, and the leakage diagnosis device comprising:
   a detecting unit that detects a physical quantity that reflects a fuel adsorption state of the canister;
   a setting unit configured to set a count threshold on the basis of the physical quantity when the physical quantity is detected by the detecting unit, the count threshold limiting the number of times of the leakage diagnosis during a stop of the internal combustion engine; and
   a leakage diagnosis repeating unit configured to repeat the leakage diagnosis within the number of times limited on the basis of the count threshold, when the count threshold is set by the setting unit.

2. The leakage diagnosis device according to claim 1, wherein the leakage diagnosis repeating unit is configured to execute i) a count process of performing a process of clearing a diagnosis execution counter each time the count threshold is set and a process of adding an accumulated value to the diagnosis execution counter each time the leakage diagnosis is carried out after the count threshold is set, and ii) a leakage diagnosis limiting process of permitting the leakage diagnosis to be repeatedly carried out while the diagnosis execution counter is smaller than the count threshold and prohibiting the leakage diagnosis from being repeatedly carried out when the diagnosis execution counter is equal to or larger than the count threshold.

3. The leakage diagnosis device according to claim 2, wherein
in the count process of the leakage diagnosis repeating unit, the accumulated value is set on the basis of a state where fuel vapor is introduced into the canister at the time of each leakage diagnosis or a state where fuel vapor is introduced into the canister at the time of a process performed simultaneously with each leakage diagnosis, and the accumulated value is added to the diagnosis execution counter.

4. The leakage diagnosis device according to claim 3, wherein
in the count process of the leakage diagnosis repeating unit, when the fuel tank is included in the compartment, the accumulated value is set on the basis of an internal pressure of the fuel tank before the leakage diagnosis, and the accumulated value is added to the diagnosis execution counter.

5. The leakage diagnosis device according to claim 2, wherein
the leakage diagnosis repeating unit is configured to determine whether to carry out a first leakage diagnosis, executed immediately after the count threshold is set, on the basis of the physical quantity detected by the detecting unit, the leakage diagnosis repeating unit is configured to prohibit a subsequent leakage diagnosis from being carried out until the physical quantity is newly detected, when the first leakage diagnosis is not executed, and
the leakage diagnosis repeating unit is configured to execute the count process and the leakage diagnosis limiting process, when the first leakage diagnosis is executed.

6. The leakage diagnosis device according to claim 1, wherein
the detecting unit is configured to detect a purged fuel concentration, as the physical quantity, at the time when fuel vapor is purged from the canister to an intake passage of the internal combustion engine during operation of the internal combustion engine.

7. The leakage diagnosis device according to claim 6, wherein
the detecting unit is configured to detect the purged fuel concentration on the basis of a control deviation amount in air-fuel ratio in air-fuel ratio feedback control executed during purging.

8. The leakage diagnosis device according to claim 1, wherein
a shut-off valve is provided between the fuel tank and the canister, and
the shut-off valve is configured to be closed to hermetically close the fuel tank during a stop of the internal combustion engine, and is configured to be opened to emit gas from the fuel tank via the canister at the time of the leakage diagnosis of the fuel tank, and the leakage diagnosis is performed on the basis of an internal pressure state of the fuel tank at the time of the leakage diagnosis.

9. A leakage diagnosis method that carries out a leakage diagnosis on the basis of an internal pressure state of an airtight compartment by emitting gas from the compartment via a canister during a stop of the internal combustion engine, the compartment being formed in an evaporative fuel processing mechanism for an internal combustion engine, the evaporative fuel processing mechanism including a fuel tank, and the leakage diagnosis method comprising:
detecting a physical quantity that reflects a fuel adsorption state of the canister;
setting a count threshold on the basis of the detected physical quantity when the physical quantity is detected by the detecting unit; and
repeating the leakage diagnosis within the number of times of leakage diagnosis during a stop of the internal combustion engine limited on the basis of the set count threshold.

10. The leakage diagnosis method according to claim 9, wherein
when the leakage diagnosis is repeated, i) a count process of performing a process of clearing a diagnosis execution counter each time the count threshold is set and a process of adding an accumulated value to the diagnosis execution counter each time a leakage diagnosis is carried out after the count threshold is set and ii) a leakage diagnosis limiting process of permitting a leakage diagnosis to be repeatedly carried out while the diagnosis execution counter is smaller than the count threshold and prohibiting a leakage diagnosis from being repeatedly carried out when the diagnosis execution counter is equal to or larger than the count threshold are executed.

11. The leakage diagnosis method according to claim 10, wherein
in the count process, the accumulated value is set on the basis of a state where fuel vapor is introduced into the canister at the time of each leakage diagnosis or a state where fuel vapor is introduced into the canister at the time of a process performed simultaneously with each leakage diagnosis, and the accumulated value is added to the diagnosis execution counter.

12. The leakage diagnosis method according to claim 11, wherein
in the count process, when the fuel tank is included in the compartment, the accumulated value is set on the basis of an internal pressure of the fuel tank before the leakage diagnosis, and the accumulated value is added to the diagnosis execution counter.

13. The leakage diagnosis method according to claim 10, wherein
when the leakage diagnosis is repeated, it is determined whether to carry out a first leakage diagnosis, executed immediately after the count threshold is set, on the basis of the detected physical quantity,
when the first leakage diagnosis is not executed, a subsequent leakage diagnosis is prohibited from being carried out until the physical quantity is newly detected, and
when the first leakage diagnosis is executed, the count process and the leakage diagnosis limiting process are executed.

14. The leakage diagnosis method according to claim 9, wherein
a purged fuel concentration, as the physical quantity, is detected at the time when fuel vapor is purged from the canister to an intake passage of the internal combustion engine during operation of the internal combustion engine.

15. The leakage diagnosis method according to claim 14, wherein
the purged fuel concentration is detected on the basis of a control deviation amount in air-fuel ratio in air-fuel ratio feedback control executed during purging.

16. The leakage diagnosis method according to claim 9, further comprising:
closing a shut-off valve provided between the fuel tank and the canister to hermetically close the fuel tank during a stop of the internal combustion engine; and
opening the shut-off valve to emit gas from the fuel tank via the canister at the time of the leakage diagnosis of the fuel tank, wherein
the leakage diagnosis is performed on the basis of an internal pressure state of the fuel tank at the time of the leakage diagnosis.

17. A leakage diagnosis device that carries out a leakage diagnosis on the basis of an internal pressure state of an airtight compartment by emitting gas from the compartment via a canister during a stop of an internal combustion engine, the internal combustion engine is mounted on a vehicle as a vehicle drive source together with an electric motor, and a control that performs EV travelling in which the vehicle travels with only an output from the electric motor and HV travelling in which the vehicle travels with an output from the internal combustion engine and an output from the electric motor is executed by an electronic control unit, the compartment being formed in an evaporative fuel processing mechanism for the internal combustion engine, the evaporative fuel processing mechanism including a fuel tank, and the leakage diagnosis device comprising:
a detecting unit that detects a physical quantity that reflects a fuel adsorption state of the canister;
a setting unit configured to set a count threshold on the basis of the physical quantity when the physical quantity is detected by the detecting unit, the count threshold limiting the number of times of the leakage diagnosis during a stop of the internal combustion engine; and
a leakage diagnosis repeating unit configured to repeat the leakage diagnosis within the number of times limited on the basis of the count threshold, when the count threshold is set by the setting unit.

18. The leakage diagnosis device according to claim 17, wherein
a storage battery that supplies electric power to the electric motor is chargeable from a power supply outside the vehicle, other than charging with electric power generated by the internal combustion engine.

* * * * *